United States Patent

Suzuki et al.

Patent Number: 5,355,244
Date of Patent: Oct. 11, 1994

[54] OPTICAL SCANNER FOR REDUCING SHADING

[75] Inventors: Seizoh Suzuki, Tokyo; Kenichi Takanashi, Chiba; Hiromichi Atsuumi, Yokohama, all of Japan

[73] Assignee: Ricoh Company Ltd., Tokyo, Japan

[21] Appl. No.: 945,269

[22] Filed: Sep. 15, 1992

[30] Foreign Application Priority Data

| Sep. 18, 1991 | [JP] | Japan | 3-238341 |
| Nov. 6, 1991 | [JP] | Japan | 3-290096 |
| Nov. 19, 1991 | [JP] | Japan | 3-303352 |
| Feb. 24, 1992 | [JP] | Japan | 4-36500 |
| Jun. 17, 1992 | [JP] | Japan | 4-158249 |

[51] Int. Cl.⁵ ............................................. G02B 26/08
[52] U.S. Cl. ................................. 359/212; 359/217; 359/883
[58] Field of Search ............ 359/196–208, 359/212–221, 223–226, 584, 589, 585, 850, 17, 346, 883; 250/234–236; 346/108, 160

[56] References Cited

U.S. PATENT DOCUMENTS

| 4,753,504 | 6/1988 | Kyogoku | 359/217 |
| 4,756,584 | 7/1988 | Takanashi . | |
| 4,838,631 | 6/1989 | Chande et al. | 359/221 |

Primary Examiner—Loha Ben
Assistant Examiner—James Phan
Attorney, Agent, or Firm—Fish & Richardson

[57] ABSTRACT

In an optical scanner for reducing shading, a semiconductor laser or a semiconductor laser array is set to a light source and a laser beam from the light source is deflected by a light deflector having a deflecting reflecting face and is converged by a lens for scanning as a light spot on a scanned face to perform an optical scanning operation. The optical scanner comprises one or more bending mirrors for bending an optical path of the laser beam and arranged between the light deflector and the scanned face; and an increased reflecting coating film disposed on a mirror face of the one or more mirrors such that reflectivity is gradually increased from a central portion of the increased reflecting coating film in a main scan-corresponding direction toward both end portions of the film.

3 Claims, 12 Drawing Sheets

OPTICAL SCANNER FOR REDUCING SHADING

BACKGROUND OF THE INVENTION

1. Field of the Invention

The present invention relates to an optical scanner for reducing shading in which an optical scanning operation is performed by a lens for scanning.

2. Description of the Related Art

An optical scanner is widely known in association with a laser printer, etc. The optical scanner has a scanned face set in conformity with a surface of an optical recording medium such as a photosensitive body and optically scanned by a laser beam. In a general optical arrangement of the optical scanner, the laser beam from a laser beam source is deflected by a light deflecting means such as a rotary polygon mirror. The laser beam is then formed by a lens for scanning as a light spot on the scanned face. Therefore, an incident angle of the laser beam incident to the scanning lens and a deflecting reflecting face of the light deflecting means is continuously changed during an optical scanning operation on one line. Reflectivity on the deflecting reflecting face and reflectivity and transmittance on a face of the scanning lens are changed in accordance with the incident angle. Therefore, intensity of the light spot on the scanned face is generally changed in accordance with the height of an image. The change in light intensity on one line in the optical scanning operation is called "shading". The shading is seriously caused when the light beam incident to the deflecting reflecting face is linearly polarized. In general, the light intensity tends to be decreased or increased on both end sides of the image in a main scanning direction in comparison with a central portion of the image.

An extinction ratio is equal to about 20 dB with respect to the laser beam emitted from a semiconductor laser and a semiconductor laser array used as a light source of the optical scanner. A great part of this laser beam is linearly polarized so that shading tends to be caused. Recently, the optical scanning operation has been performed at a wide angle to make the optical scanner compact. Accordingly, the area of a changing region of the above incident angle is increased so that shading tends to be increased. On the other hand, the high quality of an image recorded in the optical scanning operation is required. Accordingly, there is a problem about a reduction in quality of the recorded image caused by shading.

SUMMARY OF THE INVENTION

It is therefore an object of the present invention to provide an optical scanner for reducing shading.

The object of the present invention can be achieved by an optical scanner for reducing shading in which a semiconductor laser or a semiconductor laser array is set to a light source and a laser beam from the light source is deflected by light deflecting means having a deflecting reflecting face and is converged by a lens for scanning as a light spot on a scanned face to perform an optical scanning operation. The optical scanner comprises an antireflection coating film disposed on only a refractive face for providing a largest change in incident angle in the deflection of the laser beam with respect to faces of optical elements arranged on an optical path from the light deflecting means to the scanned face to transmit the laser beam through the optical elements.

The object of the present invention can be also achieved by an optical scanner for reducing shading in which a semiconductor laser or a semiconductor laser array is set to a light source and a laser beam from the light source is deflected by light deflecting means having a deflecting reflecting face and is converged by a lens for scanning as a light spot on a scanned face to perform an optical scanning operation. The optical scanner comprises an antireflection coating film disposed on one or more lens faces of the scanning lens such that transmittance of the scanning lens is gradually increased from an optical axis thereof toward both end portions in a main scan-corresponding direction.

The object of the present invention can be also achieved by an optical scanner for reducing shading in which a semiconductor laser or a semiconductor laser array is set to a light source and a laser beam from the light source is deflected by light deflecting means having a deflecting reflecting face and is converged by a lens for scanning as a light spot on a scanned face to perform an optical scanning operation. The optical scanner comprises one or more mirrors for bending an optical path of the laser beam and arranged between the light deflecting means and the scanned face; and an increased reflecting coating film disposed on a mirror face of the one or more mirrors such that reflectivity is gradually increased from a central portion of the increased reflecting coating film in a main scan-corresponding direction toward both end portions of this film.

In accordance with each of the above optical scanners, it is possible to effectively reduce shading based on the relation between an optical scanning system and a polarizing direction of the laser beam emitted from the semiconductor laser or the semiconductor laser array as the light source, thereby performing a preferable optical scanning operation.

Further objects and advantages of the present invention will be apparent from the following description of the preferred embodiments of the present invention as illustrated in the accompanying drawings.

DESCRIPTION OF THE PREFERRED EMBODIMENTS

Figure 1A:
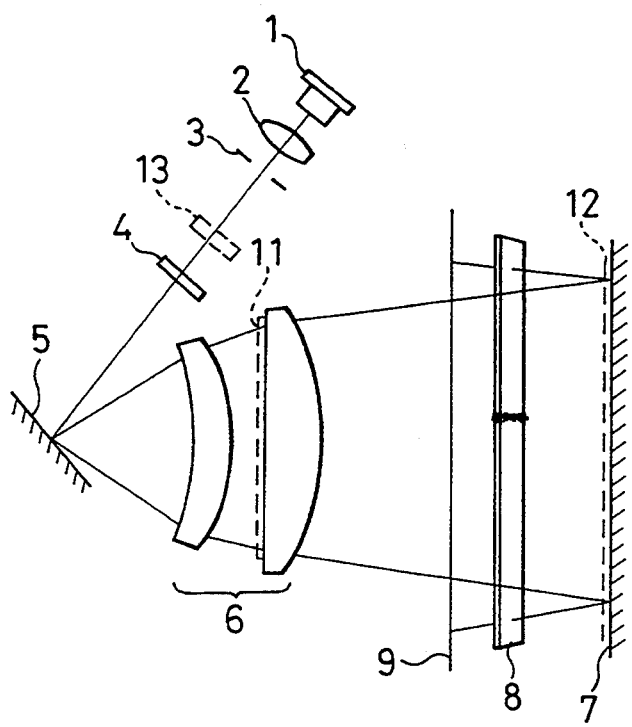
FIGS. 1a to 1c are views for explaining the construction of an optical scanner in accordance with the present invention.

The preferred embodiments of an optical scanner for reducing shading in the present invention will next be described in detail with reference to the accompanying drawings.

In an optical scanner of the present invention, a semiconductor laser or a semiconductor laser array is set to a light source and a laser beam from the light source is deflected by light deflecting means having a deflecting reflecting face and is converged by a lens for scanning as a light spot on a scanned face to perform an optical scanning operation.

In such an optical scanner, it is assumed that an optical path from the light source to the scanned face is virtually developed linearly along an optical axis of the scanning lens. A main scan-corresponding direction is set to a direction parallel to a main scanning direction and corresponding to this main scanning direction in an arbitrary position of this virtual optical path. A cross scan-corresponding direction is set to a direction parallel to a cross scanning direction and corresponding to this cross scanning direction in the arbitrary position of the virtual optical path.

In the optical scanner having a first structure of the present invention, to reduce shading, an antireflection coating film is disposed on only a refractive face for providing a largest change in incident angle in the deflection of the laser beam with respect to faces of optical elements arranged on an optical path from the light deflecting means to the scanned face to transmit the laser beam through the optical elements.

In the optical scanner having a second structure of the present invention, to reduce shading, an antireflection coating film is disposed on one or more lens faces of the scanning lens such that transmittance of the scanning lens is gradually increased from an optical axis thereof toward both end portions in the main scan-corresponding direction.

In the optical scanner having a third structure of the present invention, the antireflection coating film disposed on one or more lens faces of the scanning lens is set to be thicker than an optimum thickness with respect to a wavelength of the laser beam. Otherwise, in the optical scanner having a fourth structure of the present invention, the antireflection coating film disposed on one or more lens faces of the scanning lens is set to be gradually thicker from an optical axis portion of the scanning lens toward sides of the both end portions in the main scan-corresponding direction. In the third and fourth structures, light transmitted through the scanning lens is gradually increased from the optical axis toward both end portions in the main scan-corresponding direction.

In the optical scanner, one or more mirrors for bending an optical path of the laser beam can be arranged between the light deflecting means and the scanned face.

In accordance with a fifth structure of the present invention, the optical scanner has one or more mirrors for bending an optical path of the light beam. In the optical scanner having the fifth structure, an increased reflecting coating film is disposed on a mirror face of the one or more mirrors such that reflectivity is gradually increased from a central portion of the increased reflecting coating film in the main scan-corresponding direction toward both end portions of this film. To concretely provide the fifth structure, the increased reflecting coating film is set to be gradually thicker toward the both end portions from the central portion in the main scan-corresponding direction in accordance with a sixth structure of the present invention. Otherwise, the increased reflecting coating film is set to be thicker than an optimum thickness with respect to a wavelength of the laser beam in accordance with a seventh structure of the present invention.

In an eighth structure of the present invention, a ¼ wavelength plate is arranged on an optical path between the light source and the light deflecting means in the above optical scanner such that the laser beam incident to the light deflecting means is substantially circularly polarized. In a certain case, another optical system is arranged between the light source and the ¼ wavelength plate. Therefore, when the laser beam from the light source is linearly polarized, the linearly polarized light is changed in a certain case to elliptically polarized light having a very short minor axis as a single axis while the laser beam passes through this another optical system. In such a case, no polarizing state of the light beam transmitted through the ¼ wavelength plate is strictly a circularly polarized state. In a sixth structure of the present invention, substantially circularly polarized light includes polarized light provided when such elliptically polarized light is transmitted through the ¼ wavelength plate.

In a ninth structure of the present invention, a ½ wavelength plate is arranged on an optical path between the light source and the light deflecting means in the above optical scanner. The direction of a main cross section of this ½ wavelength plate is set such that shading is preferably reduced.

In a tenth structure of the present invention, the above one or more mirrors for bending an optical path of the laser beam are arranged between the light deflecting means and the scanned face in the optical scanner having each of the eighth and ninth structures. Each of the above ¼ and ½ wavelength plates may be arranged in an arbitrary position between the light source and the deflecting reflecting face.

In an eleventh structure of the present invention, a semiconductor laser or a semiconductor laser array is used as the light source and the laser beam from the light source is deflected by light deflecting means having a deflecting reflecting face. This deflected light beam is then converged by a lens for scanning as a light spot on a scanned face to perform an optical scanning operation. Further, one or more mirrors for bending an optical path of the light beam are arranged between the light deflecting means and the scanned face. An angle of inclination of each of the one or more mirrors in the main scan-corresponding direction and/or the cross scan-corresponding direction is set such that shading is preferably reduced.

Similar to the eleventh structure of the present invention, one or more mirrors for bending an optical path of the laser beam are arranged between the light deflecting means and the scanned face in the optical scanner having the fifth or tenth structure. In a twelfth structure of the present invention, an angle of inclination of each of the one or more mirrors in the main scan-corresponding direction and/or the cross scan-corresponding direction is set such that shading is preferably reduced.

In FIG. 1A, a laser beam is emitted from a laser beam source 1 and is transmitted through a condenser lens 2 and an aperture 3. This light beam is then converged by a cylindrical lens 4 in a cross scan-corresponding direction. The cross-scan corresponding direction is a direction perpendicular to a paper face of FIG. 1a. The light beam is focused and formed as a linear image extending in a main scan-corresponding direction in the position of a deflecting reflecting face 5. The laser beam reflected on the deflecting reflecting face 5 is deflected in accordance with rotation of the deflecting reflecting face 5 and is incident to a lens 6 for scanning. The deflected laser beam transmitted through the scanning lens 6 is then reflected on a mirror 7 for bending an optical path of the light beam. Thus, the optical path of the light beam is bent and the light beam is converged as a light spot on a scanned face 9 through a cover glass 8 of an optical scanner. The scanned face 9 is optically scanned by the light beam and a surface of a photosensitive body, etc. are arranged on the scanned face 9.

The condenser lens 2 may be constructed by a collimator lens for changing the laser beam from the laser beam source 1 to a parallel beam. The condenser lens 2 may be also constructed by a lens for changing the laser beam to a convergent beam. Further, the condenser lens 2 may be constructed by a lens for changing the light beam to a slightly divergent beam. In the example shown in FIG. 1a, the condenser lens 2 is constructed by a collimator lens. The aperture 3 is disposed to set a shape of the light spot on the scanned face 9. The cylindrical lens 4 is disposed to correct inclination of the deflecting reflecting face 5. It is not necessary to dispose the cylindrical lens 4 when there is no inclination of the deflecting reflecting face 5 and another kind of correction of the inclination of a reflecting face is performed.

The deflecting reflecting face 5 is a reflecting face of a light deflecting means.

This deflecting reflecting face 5 is disposed to reflect the laser beam and deflect the reflected laser beam by rotation or swing. A rotary polygon mirror, a rotary double mirror, or a so-called tenon-type mirror can be constructed as the light deflecting means having a rotated deflecting reflecting face. A galvanomirror can be constructed as the swung deflecting reflecting face. In the example shown in FIG. 1a, the light deflecting means is constructed by a rotary polygon mirror.

The lens 6 for scanning is a lens for converging the deflected laser beam as a light spot on the scanned face. When the light deflecting means has the rotated deflecting reflecting face, the scanning lens 6 is generally constructed by an $f\theta$ lens. In contrast to this, when the light deflecting means has the swung deflecting reflecting face, the scanning lens 6 is constructed by f·sin $\theta$ lens. When an optical scanning operation is performed at an equal speed by electrical correction, there is a case in which the scanning lens 6 is normally constructed by an image forming lens. In the example shown in FIG. 1a, the scanning lens 6 is constructed by an anamorphic $f\theta$ lens. Positions of the deflecting reflecting face 5 and the scanned face 9 are set by the scanning lens 6 in a conjugate relation in geometrical optics with respect to the cross scan-corresponding direction. The scanning lens 6 corrects the inclination of the deflecting reflecting face in cooperation with the cylindrical lens 4. To correct the inclination of the deflecting reflecting face, it is possible to use an elongated cylindrical or toroidal lens as a portion of the scanning lens 6 instead of the cylindrical lens 4 such that the elongated lens is arranged in the vicinity of the scanned face.

The mirror 7 is disposed to bend the optical path of the deflected laser beam. The mirror 7 is normally arranged in accordance with a layout of the optical scanner. Accordingly, the mirror 7 can be omitted. However, in the optical scanner having each of the fifth, ninth and tenth structures, shading is reduced by positively using the mirror of this kind. The cover glass 8 is used as a dustproof member in the optical scanner.

Figure 1B:
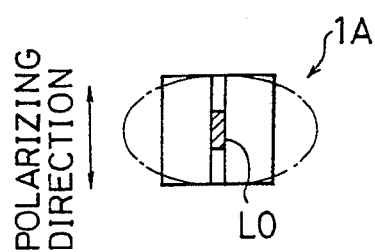

The light source 1 will next be described in detail. In the optical scanner of the present invention, a semiconductor laser or a semiconductor laser array is used as the light source 1. As shown in FIG. 1b, the semiconductor laser 1A has a small light emitting portion L0 having a rectangular shape. A laser beam emitted from the semiconductor laser 1A is substantially constructed by linearly polarized light having a polarizing direction equal to a longitudinal direction of the light emitting portion L0. As shown by a chain line in FIG. 1b, a far field pattern of the emitted laser beam has an elliptical shape having a uniaxial direction as the polarizing direction. This field pattern is normally set to improve light utilization efficiency such that the polarizing direction is parallel to the cross scan-corresponding direction and corresponds to this cross scan-corresponding direction. In the following description, A-mode is an optical scanning mode for performing the optical scanning operation in a state in which the polarizing direction in the light source is approximately parallel to the cross scan-corresponding direction and corresponds to this cross scan-corresponding direction.

Figure 1C:
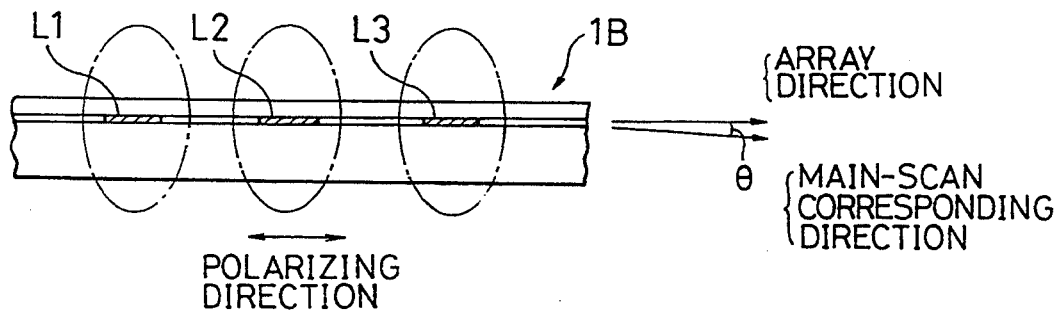

As shown in FIG. 1c, the semiconductor laser array 1B is constructed by a monolithic structure in which a plurality of laser light emitting portions L1, L2, L3, - - - are arranged in a line and are spaced from each other at an equal distance along a junction face. In this case, the polarizing direction of a laser beam from each of the light emitting portions is parallel to an array direction. When the semiconductor laser array is used as the light source, the optical scanning operation can be performed at one time with respect to the number of lines equal to -the number of light emitting portions.

When the semiconductor laser array 1B is used as the light source 1, it is considered that the array direction as an arranging direction of the light emitting portions is parallel to the cross scan-corresponding direction and corresponds to this cross scan-corresponding direction. In this case, the optical scanning mode is set to the A-mode. However, when the semiconductor laser array 1B is used as the light source and the optical scanning operation is performed in the A-mode, the distance between lines simultaneously scanned is generally increased so that no optical scanning operation of high density can be easily performed in a cross scanning direction. Therefore, as shown in FIG. 1c, the semiconductor laser array is generally used as the light source in a state in which the array direction of the semiconductor laser array 1B is inclined a small angle $\theta$ such as about 5 degrees with respect to the main scan-corresponding direction. In this case, the arranging distance between the light emitting portions in a light source section is equal to d·sin $\theta$ in the cross scan-corresponding direction when d is an arranging pitch of the light emitting portions. Accordingly, it is possible to reduce the distance between adjacent lines in the optical scanning operation.

When the semiconductor laser array is used in such an arrangement, the polarizing direction of the laser beam emitted from the light source 1 is approximately parallel to the main scan-corresponding direction. In the following description, B-mode is an optical scanning mode for performing the optical scanning operation in a state in which the polarizing direction of the laser beam emitted from the light source is approximately parallel to the main scan-corresponding direction and corresponds to this main scan-corresponding direction.

In general, shading is caused in the A-mode such that intensity of the light spot is decreased as light approaches both end portions in the main scanning direction. Further, shading is caused in the B-mode such that intensity of the light spot is increased as light approaches the both end portions in the main scanning direction.

The above-mentioned explanation relates to the respective constructional portions of the optical scanner and the optical scanning modes. The present invention can be widely applied to each of the above optical scanners in each of the optical scanning modes.

When light is incident at an incident angle $\phi$ onto a surface of a medium having refractive index $n_1$ within a medium having refractive index $n_0$ and is partially reflected on this medium surface and is partially refracted at an angle $\chi$ of refraction, the well-known Snell's law $$n_0 \sin\phi = n_1 \sin\chi \quad (1)$$

is formed with respect to the incident angle $\phi$ and the refraction angle $\chi$. At this time, amplitude reflectances rp and rs and amplitude transmittances tp and ts on a boundary face with respect to P-polarized light and S-polarized light are respectively provided as follows.

$$rp = \tan(\phi-\chi)/\tan(\phi+\chi) \quad (2)$$

$$rs = -\sin(\phi-\chi)/\sin(\phi+\chi) \quad (3)$$

$$tp = 2\sin\chi\cos\phi/\{\sin(\phi+\chi)\cdot\cos(\phi-\chi)\} \quad (4)$$

$$ts = 2\sin\chi\cos\phi/\{\sin(\phi+\chi)\} \quad (5)$$

Using the above amplitude reflectances rp, rs and the above amplitude transmittances tp, ts, energy reflectances Rp and Rs and energy transmittances Tp and Ts with respect to the P-polarized light and the S-polarized light are respectively provided as follows.

$$Rp = |rp|^2 \quad (6)$$

$$Rs = |rs|^2 \quad (7)$$

$$Tp = \{(\cos\chi\cdot\sin\phi)/(\cos\phi\cdot\sin\chi)\}|tp|^2 \quad (8)$$

$$Ts = \{(\cos\chi\cdot\sin\phi)/(\cos\phi\cdot\sin\chi)\}|ts|^2 \quad (9)$$

Further, when a coating layer having refractive index $n_1$ and thickness $d_1$ is formed on a surface of a medium having refractive index $n_2$ and light is incident to this coating layer within the medium having refractive index $n_0$, energy reflectances Rp and Rs and energy transmittances Tp and Ts are respectively provided as follows.

$$Rp = rp_{01}^2 + 2rp_{12} \cdot rp_{12} \cdot \cos 2\delta_1 + rp_{12}^2 / \{1 + rp_{01} \cdot rp_{12} \cdot \cos 2\delta_1 + rp_{01}^2 \cdot rp_{12}^2\} \quad (10)$$

$$Rs = rs_{01}^2 + 2rs_{12} \cdot rs_{12} \cdot \cos 2\delta_1 + rs_{12}^2 / \{1 + rs_{01} \cdot rs_{12} \cdot \cos 2\delta_1 + rs_{02}^2 \cdot rs_{12}^2\} \quad (11)$$

$$Tp = n_2 \cdot tp_{01}^2 \cdot tp_{12}^2 / n_0 \{1 + 2rp_{01} \cdot rp_{12} \cdot \cos 2\delta_1 + rp_{01}^2 \cdot rp_{12}^2\} \quad (12)$$

$$Ts = n_2 \cdot ts_{01}^2 \cdot ts_{12}^2 / n_0 \{1 + 2rs_{01} \cdot rs_{12} \cdot \cos 2\delta_1 + rs_{12}^2\} \quad (13)$$

$rp_{01}$ and $rs_{01}$ are respectively amplitude reflectances between the coating layer and the medium having refractive index $n_0$ with respect to the P-polarized light and the S-polarized light. $tp_{01}$ and $ts_{01}$ are respectively amplitude transmittances between the coating layer and the medium having refractive index $n_0$ with respect to the P-polarized light and the S-polarized light. The amplitude reflectances $rp_{01}$ and $rs_{01}$ and the amplitude transmittances $tp_{01}$ and $ts_{01}$ are calculated by the above formulas (2) to (5).

Similarly, $rp_{12}$ and $rs_{12}$ are respectively amplitude reflectances between the coating layer and the medium having refractive index $n_2$ with respect to the P-polarized light and the S-polarized light. $tp_{12}$ and $ts_{12}$ are respectively amplitude transmittances between the coating layer and the medium having refractive index $n_2$ with respect to the P-polarized light and the S-polarized light. The amplitude reflectances $rp_{12}$ and $rs_{12}$ and the amplitude transmittances $tp_{12}$ and $ts_{12}$ are calculated by the above formulas (2) to (5). The above phase $\delta_1$ is provided by the following formula.

$$\delta_1 = (2\pi/\lambda) n_1 \cdot d_1 \cdot \cos\chi$$

In this formula, $\mu$ designates a wavelength of the light beam. When the coating layer is formed by a plurality of layers, the above relations are sequentially applied every one layer so that Rp, Tp, Rs and Ts can be calculated.

The amplitude reflectances and the amplitude transmittances constituting bases of the calculations of the energy reflectances and the energy transmittances depend on the incident angle with respect to each of the P-polarized light and the S-polarized light. Accordingly, reflectivity and transmittance are changed when the incident angle is changed.

In FIG. 1a showing the construction of the optical scanner, the deflecting reflecting face 5, the scanning lens 6, the mirror 7 for bending an optical path and the cover glass 8 constitute optical elements having incident angles of the laser beam changed during one main scanning operation. The deflecting reflecting face 5 and the mirror 7 have problems about a change in reflectivity caused by the change in incident angle. The scanning lens 6 and the cover glass 8 have problems about a change in transmittance caused by the change in incident angle. The cover glass 8 is constructed by a plane parallel plate made of glass and both faces of the cover glass 8 are constructed by refractive faces since an angle of refraction is changed in accordance with the change in incident angle.

Shading generated by the change in transmittance caused by the change in incident angle will next be considered. In this case, the generation of shading is most greatly influenced by the change in transmittance on a face providing a largest change in incident angle caused by the optical scanning operation. Therefore, in the first structure of the present invention, an antireflection coating film is disposed on only a refractive face for providing the largest change in incident angle in the deflection of the laser beam with respect to faces of optical elements arranged on an optical path from the light deflecting means to the scanned face to transmit the laser beam through the optical elements. Shading can be reduced in accordance with this first structure.

In the second structure of the present invention, an antireflection coating film is disposed on one or more lens faces of the scanning lens such that transmittance of the scanning lens is gradually increased from an optical axis thereof toward both end portions in the main scan-corresponding direction. Shading can be reduced in accordance with the second structure. As mentioned above, shading and intensity of the light spot generally tend to be reduced on both end sides of the image in the main scanning direction in comparison with a central portion of the image. Accordingly, the above general tendency of shading can be canceled by increasing transmittance of the scanning lens toward both end lens portions in the main scan-corresponding direction from an optical axis of the scanning lens.

In accordance with the third structure of the present invention, there is a method for setting the antireflection coating film to be thicker than an optimum thickness with respect to a wavelength of the laser beam. In this method, transmittance of the scanning lens is increased from its optical axis toward both lens end portions in the main scan-corresponding direction. Antireflection effects of the antireflection coating film are changed in accordance with the thickness thereof. The antireflection coating film has an optimum thickness according to the wavelength of the incident laser beam. However, the antireflection effects tend to be reduced when the antireflection coating film having this optimum thickness is formed and the incident angle is increased toward the both lens end portions in the main scan-corresponding direction. In contrast to this, when the antireflection coating film is set to be thicker than the above optimum thickness, the transmittance of the scanning lens is increased as the incident angle is increased. Thus, it is possible to prevent an antireflection function from being reduced.

In accordance with the fourth structure of the present invention, the antireflection coating film disposed on one or more lens faces of the scanning lens is set to be gradually thicker from an optical axis portion of the scanning lens toward sides of the both end portions in the main scan-corresponding direction. In this case, the thickness of the antireflection coating film is set to be optimum in the optical axis portion of the scanning lens. In this fourth structure, the transmittance of the scanning lens is increased as the incident angle is increased so that it is possible to prevent the above antireflection function from being reduced.

In accordance with the fifth structure of the present invention, an increased reflecting coating film is disposed on a mirror face of one or more mirrors for bending an optical path of the deflected laser beam such that reflectivity is gradually increased from a central portion of the increased reflecting coating film in the main scan-corresponding direction toward both end portions of this film. In this fifth structure, the reduction in transmittance of the above scanning lens, etc. can be corrected. In this case, in accordance with the sixth structure of the present invention, the thickness of the reflecting film may be set to be gradually thicker toward both film end portions in the main scan-corresponding direction. Further, in accordance with the seventh structure of the present invention, the increased reflecting coating film may be set to be thicker than an optimum thickness with respect to the wavelength of the laser beam.

In accordance with the eighth to tenth structures of the present invention, shading is reduced by using a wavelength plate. As shown by the above formulas (1) to (13), reflectivity and transmittance are changed in accordance with the incident angle $\phi$. However, reflectivity and transmittance with respect to the P-polarized light are different from those with respect to the S-polarized light.

Figure 2A:
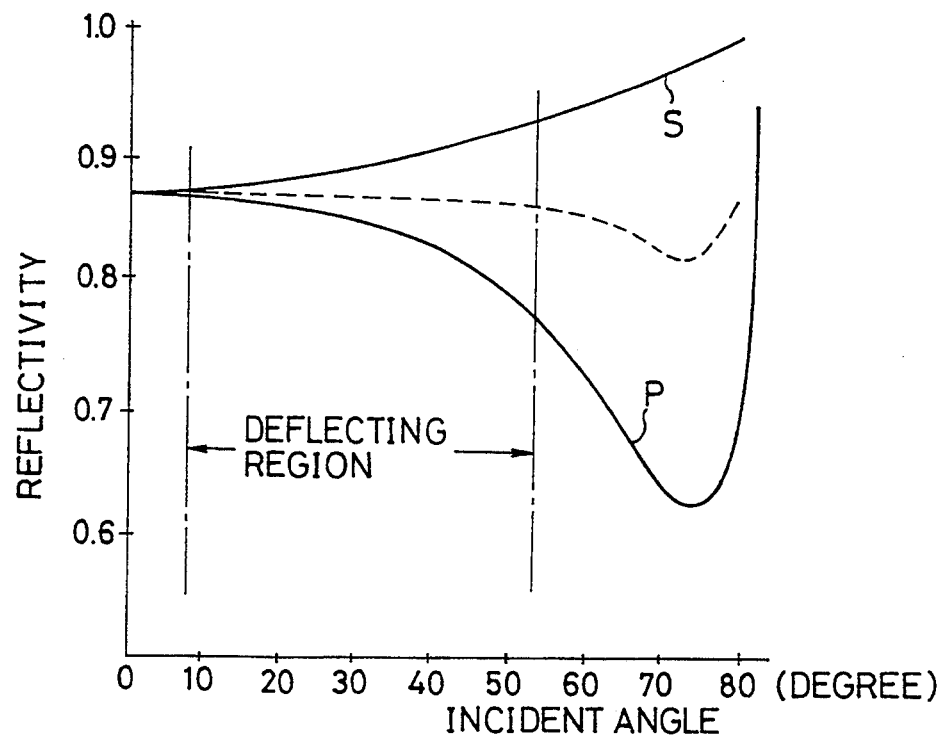
FIGS. 2a and 2b are views for explaining states in which reflectivity and transmittance are changed in accordance with an incident angle with respect to P-polarized light and S-polarized light.
Figure 2B:
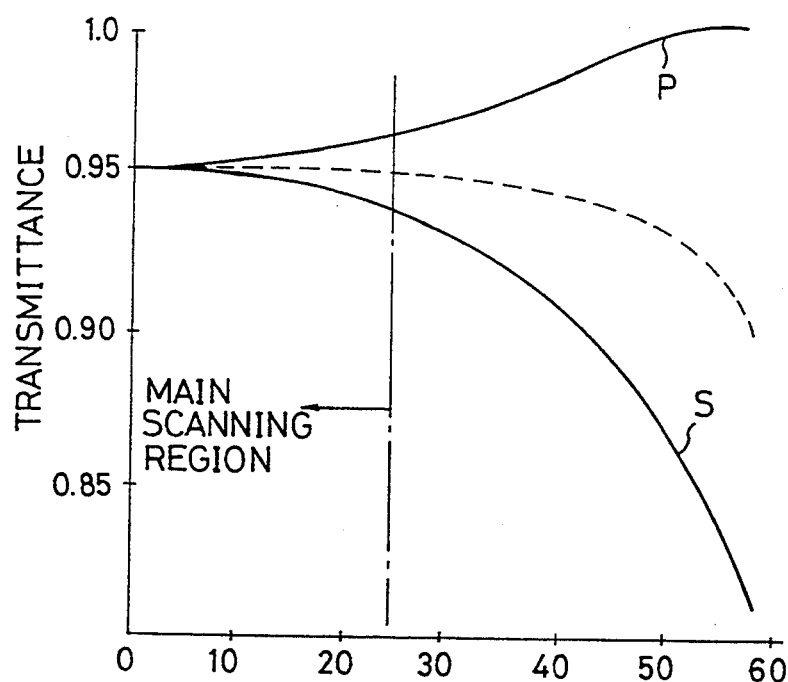

FIGS. 2a and 2b show typical examples of the corresponding relation of an incident angle and reflectivity on the deflecting reflecting face 5, and the corresponding relation of an incident angle and transmittance on a first face of the scanning lens 6. In FIGS. 2a and 2b, reference numerals P and S respectively designate the P-polarized light and the S-polarized light. The corresponding relation of reflectivity and the incident angle will first be described. In FIG. 2a, the deflecting region shows a changing region of the incident angle for performing a main scanning operation by deflecting the laser beam on the deflecting reflecting face 5. As shown in FIG. 2a, reflectivity of the S-polarized light tends to be increased within this deflecting region as the incident angle is increased. In contrast to this, reflectivity of the P-polarized light tends to be decreased within this deflecting region as the incident angle is increased.

In FIG. 1a, the polarizing direction of the laser beam emitted from the light source 1 is parallel to the cross scan-corresponding direction in the above-mentioned A-mode and corresponds to this cross scan-corresponding direction. Accordingly, a polarizing state of the laser beam incident to the deflecting reflecting face 5 is an S-polarized state. Therefore, when the optical scanning operation is performed in the A-mode, a change in reflectivity on the deflecting reflecting face 5 causes the generation of shading such that intensity of the light spot is increased from a starting point of the main scanning operation toward a terminal point thereof. Results reverse to these results are obtained in the case of the B-mode. The corresponding relation of reflectivity and the incident angle is qualitatively similar to that shown in FIG. 2a.

In FIG. 2b showing the corresponding relation of transmittance and the incident angle, the main scanning region shows a range of the incident angle of the laser beam when the scanning operation is performed on the optical axis of the scanning lens having zero incident angle and a most end portion of the main scanning region. The actual main scanning region is symmetrical with respect to the optical axis. As can be seen from FIG. 2b, transmittance of the P-polarized light generally tends to be gradually increased from a position of the optical axis toward an end portion of the main scanning region. Transmittance of the S-polarized light generally tends to be gradually decreased from the position of the optical axis toward the end portion of the main scanning region.

Broken curves in FIGS. 2a and 2b show reflectivity and transmittance with respect to circularly polarized light. As shown in FIGS. 2a and 2b, the reflectivity and transmittance of the circularly polarized light are approximately stabilized in the polarizing region and the main scanning region. Accordingly, if the laser beam incident to the deflecting reflecting face 5 is circularly polarized, changes in reflectivity and transmittance are effectively reduced on an optical path from the deflecting reflecting face to the scanned face irrespective of the A-mode and the B-mode so that shading can be reduced.

Therefore, in the eighth structure of the present invention, a ¼ wavelength plate is arranged between the light source and the deflecting reflecting face such that the laser beam incident to the deflecting reflecting face is substantially circularly polarized.

If light incident to each of reflecting and transmitting faces is linearly polarized, but a polarizing direction of this light is inclined with respect to an incident face, the incident laser beam has P-polarized and S-polarized components on the reflecting and transmitting faces. Reflectivity and transmittance of each of the P-polarized and S-polarized components are similar to those of the P-polarized light and the S-polarized light shown in FIGS. 2a and 2b. Accordingly, the P-polarized and S-polarized components are mixed with each other with respect to the reflectivity and transmittance of the polarized laser beam so that transmitting and reflecting characteristics of the P and S polarizations are canceled. Thus, a change in transmitting and reflecting characteristics is reduced with respect to the change in incident angle so that shading is reduced.

In accordance with the ninth structure of the present invention, a ½ wavelength plate is arranged between the light source and the deflecting reflecting face such that the laser beam incident to the deflecting reflecting face has both S and P polarized components.

Figure 3:
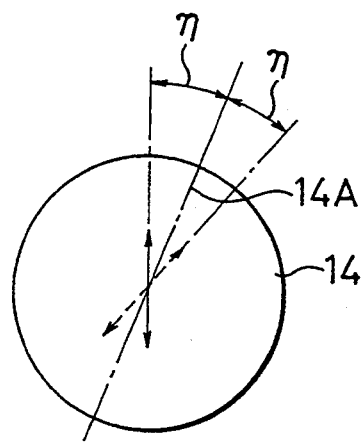
FIG. 3 is a view for explaining a $\frac{1}{2}$ wavelength plate.

FIG. 3 shows a ½ wavelength plate 14. A main cross section 14A is in conformity with the optical axis direction of a crystal. Light is polarized as shown by a solid arrow in FIG. 3 with respect to the direction of the main cross section 14A. $\eta$ is set to an angle formed between a polarizing direction of this light and the direction of the main cross section 14A. When this light is transmitted through the ½ wavelength plate 14, a plane of polarization of the transmitted light is rotated by an angle $2\eta$ with respect to a plane of polarization of the incident light as shown by a broken arrow. Accordingly, the plane of polarization of the laser beam incident to the deflecting reflecting face is rotated by using the ½ wavelength plate in the A-mode and the B-mode. Thus, the S-polarized light and the P-polarized light can be mixed with each other on reflecting and refractive faces after the deflecting reflecting face.

In this case, in accordance with the tenth structure of the present invention, one or more mirrors for bending an optical path are used between the light deflecting means and the scanned so that it is easy to adjust canceling of transmitting and reflecting characteristics of the above P-polarized and S-polarized lights.

The above ¼ wavelength plate and the above ½ wavelength plate may be arranged in any positions between the light source and the light deflecting means. For example, the ¼ wavelength plate and the ½ wavelength plate can be arranged between the light source and the condenser lens, between the condenser lens and the cylindrical lens, or between the cylindrical lens and the deflecting reflecting face. When the ¼ wavelength plate or the ½ wavelength plate is arranged between the light source and the condenser lens, the wavelength plate may be used as a cover glass of a package of the semiconductor laser or the semiconductor laser array as the light source.

Otherwise, the above two wavelength plates may be integrated with a lens cell of the condenser lens on an incident or light emitting side of the condenser lens. In this case, the two wavelength plates may be arranged such that the two wavelength plates come in contact with an incident or light emitting face of the above cylindrical lens.

In accordance with the eleventh and twelfth structures of the present invention, one or more mirrors for bending the optical path of a deflected laser beam are arranged between the deflecting reflecting face and the scanned face. Shading is reduced by adjusting an angle of inclination of each of these mirrors.

In the eleventh structure of the present invention, shading is reduced by adjusting only the inclination of each of the above mirrors. In the twelfth structure of the present invention, in addition to the adjustment of the inclination of each of the mirrors, shading is reduced by using the antireflection coating film, the increased reflecting coating film, or the wavelength plates mentioned above. Each of the mirrors is inclined in the cross scan-corresponding direction, the main scan-corresponding direction, or both the cross and main scan-corresponding directions.

A deflecting plane and a deflecting perpendicular plane are considered to explain how to incline a mirror. It is assumed that the optical axis of the scanning lens is linearly developed from the deflecting plane to the scanned face. In this state, a plane scanned by a principal ray of the laser beam ideally deflected on the deflecting reflecting face is called a deflecting plane. A plane perpendicular to the deflecting plane and including the above optical axis is called a deflecting perpendicular plane. When a mirror is inclined in the cross scan-corresponding direction, a normal line drawn on a mirror face is inclined with respect to the above optical axis on the deflecting perpendicular plane. When the mirror is inclined in the main scan-corresponding direction, the above normal line is inclined with respect to the above optical axis on the deflecting plane. When the mirror is inclined in the main and cross scan-corresponding directions, the above two inclinations are combined with each other.

Figure 4A:
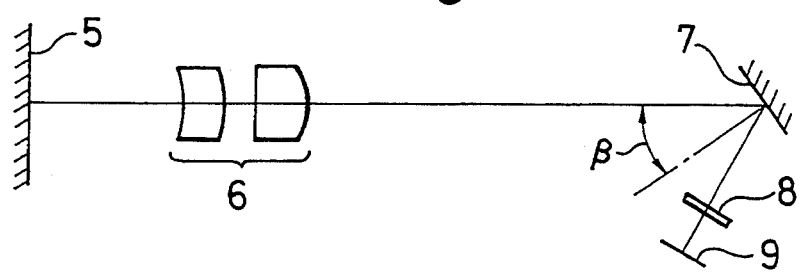
FIGS. 4a and 4b are views for explaining the influence of shading affected by a mirror for bending an optical path.

FIG. 4a shows an optical arrangement of the optical scanner shown in FIG. 1a from the deflecting reflecting face 5 to the scanned face 9 on the above deflecting perpendicular plane. A mirror 7 is arranged such that the mirror 7 is inclined an angle $\alpha$ in the cross scan-corresponding direction. When a deflected laser beam is incident to the mirror 7 at an incident angle $\beta$ on the above deflecting plane, an angle $\phi$ formed between the deflected laser beam and a normal line of the mirror 7 is an incident angle with respect to the mirror 7 and is provided as follows by using the above angles $\alpha$ and $\beta$.

$$\phi = \cos^{-1}(\cos\alpha \cdot \cos\beta) \qquad (14)$$

When the deflected laser beam is linearly polarized, reflectivity of the laser beam using the mirror is provided as follows by using the above Rp and Rs and an angle $\theta$ formed between an incident face and a linear polarizing direction in the case of the incident angle $\phi$.

$$R=\sqrt{\{(Rp\cdot\cos\theta)^2+(Rs\cdot\sin\theta)^2\}} \quad (15)$$

Figure 4B:
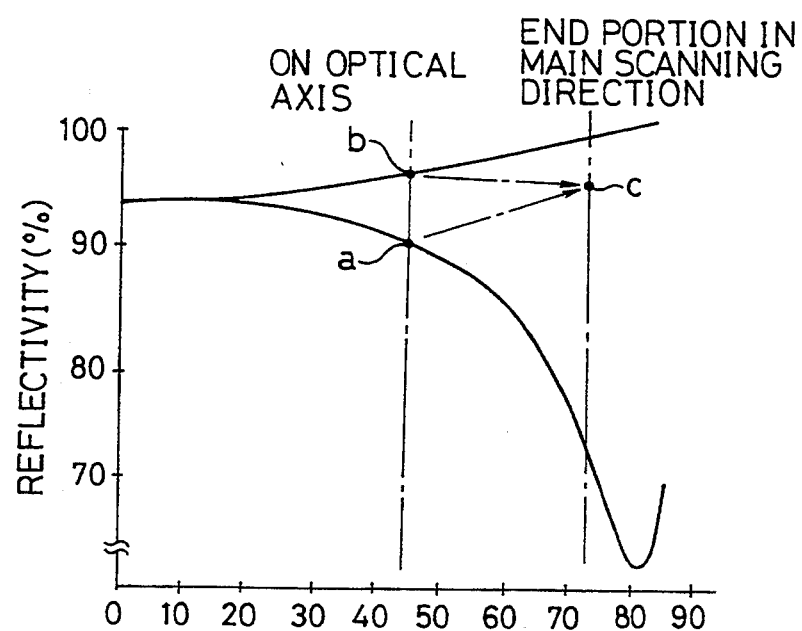

For example, when the mirror 7 is constructed by coating an aluminum mirror with a high reflecting coating film, reflectivities of the P-polarized light and the S-polarized light are changed as shown by curves P and S in FIG. 4b in accordance with a change in incident angle. When the angle of inclination of the mirror 7 shown in FIG. 4a is set to 45 degrees, the incident angle $\phi$ of the polarized laser beam incident to the mirror 7 is equal to 45 degrees on the optical axis of the scanning lens in accordance with deflection of the laser beam. This incident angle $\phi$ is increased as an angle of deflection is increased.

When the optical scanning mode is first set to the A-mode, a polarizing direction of the deflected laser beam is parallel to a paper face in FIG. 4a and is a vertical direction. Accordingly, the polarized laser beam is incident to the mirror 7 as P-polarized light at an incident angle 45 degrees on the optical axis of the scanning lens 6. Therefore, reflectivity on the optical axis is provided at point a shown in FIG. 4b. The incident angle with respect to the mirror 7 is increased as the angle of deflection is increased. At this time, a P-polarized component incident to the mirror 7 is gradually decreased, but an S-polarized component incident to the mirror 7 is gradually increased. Therefore, reflectivity is gradually increased from point a toward point c in FIG. 4b as the angle of deflection is increased. As mentioned above, in shading in the A-mode, intensity of the light spot tends to be gradually reduced toward both end portions in the main scanning direction. Accordingly, the change in intensity of the light spot is restrained by the above increase in reflectivity using the mirror 7 so that shading can be effectively reduced.

In the case of the B-mode, reflectivity of the mirror 7 on the optical axis of the scanning lens is provided at point b shown in FIG. 4b. This reflectivity is slightly reduced toward point c as the angle of deflection is increased and the P-polarized component is thereby increased. In shading in the B-mode, intensity of the light spot tends to be slightly increased in both end portions of an image in the main scanning direction in the case of image height 0. Accordingly, shading can be effectively reduced by inclining the mirror 7 by a suitable angle in the cross scan-corresponding direction.

Shading can be similarly reduced by inclining one or more mirrors for bending an optical path in the main scan-corresponding direction.

Namely, the laser beam is normally incident to the deflecting reflecting face 5 at a certain incident angle in an optical scanning system. Accordingly, no intensity of the light spot on a starting side (a minus side) of the main scanning operation is equal to that on a completing side (a plus side) of the main scanning operation. Therefore, a difference in light quantity between the plus and minus sides with respect to an image height can be reduced by inclining the mirror 7 in the main scanning direction.

For example, in the A-mode, the reflectivity of light reflected on the deflecting reflecting face on the minus side is higher than that on the plus side. When the mirror 7 is also inclined in the main scan-corresponding direction, the S-polarized component on the plus side is larger than that on the minus side so that reflectivity on the plus side is increased. As a result, the difference in light quantity between the plus and minus sides is reduced so that shading is reduced.

Concrete Embodiments of the present invention will next be described.

In a first Embodiment, the first structure of the present invention is applied to the optical scanner shown in FIG. 1a.

As mentioned above, in accordance with the features of the first structure of the present invention, an antireflection coating film is disposed on only a refractive face for providing a largest change in incident angle in the deflection of the laser beam with respect to faces of optical elements arranged on an optical path from the light deflecting means to the scanned face to transmit the laser beam through the optical elements. Before a detailed explanation of the first structure, respective interfaces of optical elements such as reflecting and refractive faces from the deflecting reflecting face 5 to the scanned face 9, and reflectivity and transmittance on these interfaces in the optical scanner shown in FIG. 1a are shown in a state in which no antireflection coating film is formed.

First, the deflecting reflecting face 5 is formed by coating an aluminum mirror face with an SiO film having a thickness half a used wavelength 780 nm. The relation between an incident angle and reflectivity on this deflecting reflecting face is provided as shown in FIG. 2a.

Each of two lenses constituting the scanning lens 6 is made of polycarbonate and no surface of each of the two lenses is coated. The relation between an incident angle and transmittance on each of faces of these lenses is provided as shown in FIG. 2b.

The mirror 7 for bending an optical path has a high reflection coating film composed of four layers which are formed by alternately laminating a thin film made of $MgF_2$ and a thin film made of $TiO_2$ on an aluminum mirror face. Each of these thin films has a thickness $\frac{1}{4}$ times the used wavelength. The cover glass 8 is constructed by a plane parallel plate made of glass and no front and rear faces of the cover glass 8 are coated.

The incident angle of a light beam incident to each of the reflecting and refractive faces is provided in the following table in association with the height of an image formed on the scanned face by the light spot. In this table, the image height is shown by a distance (unit: mm) from a position corresponding to the optical axis of the scanning lens to a position of the light spot in the main scanning direction. Reference numerals $\alpha$ and $\beta$ respectively designate incident projecting angles of the light beam in the cross scan-corresponding direction and the main scan-corresponding direction as mentioned above. These incident projecting angles are shown by a unit of degree.

| image height: | −150 | −100 | −50 | 0 | +50 | +100 | +150 |
|---|---|---|---|---|---|---|---|
| deflecting $\alpha$ | 52 | 45 | 37 | 30 | 23 | 16 | 8 |
| reflecting face $\beta$ | 0 | 0 | 0 | 0 | 0 | 0 | 0 |
| lens for scanning | | | | | | | |
| first face | | | | | | | |
| $\alpha$ | 29 | 20 | 10 | 0 | 10 | 20 | 29 |
| $\beta$ | 0 | 0 | 0 | 0 | 0 | 0 | 0 |
| second face | | | | | | | |
| $\alpha$ | 16 | 11 | 6 | 0 | 6 | 11 | 16 |
| $\beta$ | 0 | 0 | 0 | 0 | 0 | 0 | 0 |
| third face | | | | | | | |
| $\alpha$ | 38 | 26 | 13 | 0 | 13 | 26 | 38 |

-continued

| | | | | | | | |
|---|---|---|---|---|---|---|---|
| β | 0 | 0 | 0 | 0 | 0 | 0 | 0 |
| fourth face | | | | | | | |
| α | 1 | 2 | 2 | 0 | 2 | 2 | 1 |
| β | 0 | 0 | 0 | 0 | 0 | 0 | 0 |
| mirror for bending optical path | | | | | | | |
| α | 24 | 17 | 9 | 0 | 9 | 17 | 24 |
| β | 25 | 25 | 25 | 25 | 25 | 25 | 25 |
| cover glass first face | | | | | | | |
| α | 24 | 17 | 9 | 0 | 9 | 17 | 24 |
| β | 0 | 0 | 0 | 0 | 0 | 0 | 0 |
| second face | | | | | | | |
| α | 24 | 17 | 9 | 0 | 9 | 17 | 24 |
| β | 0 | 0 | 0 | 0 | 0 | 0 | 0 |

It should be understood from the above table that the mirror 7 is inclined 25 degrees in the cross scan-corresponding direction.

The relation between image heights and reflectivity and transmittance on each of the above interfaces is provided in the following table. In this table, reference numerals A and B show optical scanning modes.

| image height: | −150 | −100 | −50 | 0 | +50 | +100 | +150 |
|---|---|---|---|---|---|---|---|
| deflecting | | | | | | | |
| A | 0.917 | 0.907 | 0.896 | 0.887 | 0.880 | 0.874 | 0.869 |
| B | 0.798 | 0.822 | 0.841 | 0.852 | 0.859 | 0.864 | 0.867 |
| lens for scanning first face | | | | | | | |
| A | 0.931 | 0.942 | 0.949 | 0.951 | 0.949 | 0.942 | 0.931 |
| B | 0.967 | 0.958 | 0.952 | 0.951 | 0.952 | 0.958 | 0.967 |
| second face | | | | | | | |
| A | 0.945 | 0.948 | 0.951 | 0.951 | 0.951 | 0.948 | 0.945 |
| B | 0.955 | 0.953 | 0.951 | 0.951 | 0.951 | 0.953 | 0.955 |
| third face | | | | | | | |
| A | 0.913 | 0.936 | 0.947 | 0.951 | 0.947 | 0.936 | 0.913 |
| B | 0.978 | 0.964 | 0.954 | 0.951 | 0.954 | 0.964 | 0.978 |
| fourth face | | | | | | | |
| A | 0.951 | 0.951 | 0.951 | 0.951 | 0.951 | 0.951 | 0.951 |
| B | 0.951 | 0.951 | 0.951 | 0.951 | 0.951 | 0.951 | 0.951 |
| mirror for bending optical path | | | | | | | |
| A | 0.979 | 0.979 | 0.978 | 0.978 | 0.978 | 0.979 | 0.979 |
| B | 0.980 | 0.983 | 0.985 | 0.986 | 0.985 | 0.983 | 0.980 |
| cover glass first face | | | | | | | |
| A | 0.946 | 0.952 | 0.956 | 0.957 | 0.956 | 0.952 | 0.946 |
| B | 0.967 | 0.962 | 0.959 | 0.957 | 0.959 | 0.962 | 0.967 |
| second face | | | | | | | |
| A | 0.946 | 0.952 | 0.956 | 0.957 | 0.956 | 0.952 | 0.946 |
| B | 0.967 | 0.962 | 0.959 | 0.957 | 0.959 | 0.962 | 0.967 |

As a result, light reaching efficiency on the scanned face is provided as follows with respect to each of image heights in both the A and B modes.

| image height: | −150 | −100 | −50 | 0 | +50 | +100 | +150 |
|---|---|---|---|---|---|---|---|
| light reaching efficiency | | | | | | | |
| A | 0.614 | 0.640 | 0.651 | 0.650 | 0.639 | 0.616 | 0.582 |
| B | 0.682 | 0.626 | 0.626 | 0.629 | 0.639 | 0.658 | 0.682 |

Using this light reaching efficiency, a shading amount with respect to each of the above image heights is defined as {(light reaching efficiency at image height)/(maximum light reaching efficiency)−1}×100(%).

In this case, the shading amount at each of the above image heights is provided as follows in each of the optical scanning A and B modes.

| | shading amount | | | | | | |
|---|---|---|---|---|---|---|---|
| image height: | −150 | −100 | −50 | 0 | +50 | +100 | +150 |
| A mode | −5.7 | −1.7 | 0 | −0.2 | −1.8 | −5.4 | −10.6 |
| B mode | −7.9 | −8.2 | −8.2 | −7.8 | −7.8 | −3.5 | 0 |

Figure 5:
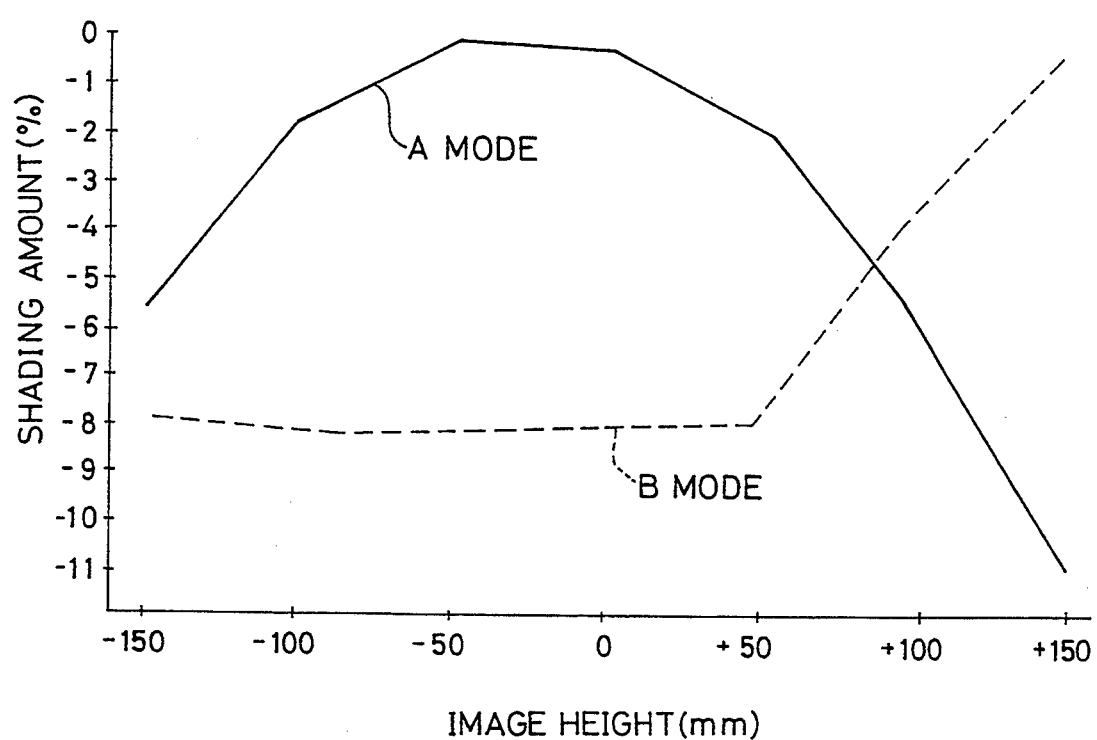
FIG. 5 is a graph showing shading states in an optical scanning operation in A and B modes.

As mentioned above, in the A-mode, the shading amount is decreased in the case of a low image height, but is increased as the image height is increased. FIG. 5 shows shading states in both the A and B modes.

In view of the change in incident angle of the laser beam incident to each of the interfaces, a refractive face for providing a largest change in incident angle on each of these interfaces in accordance with the main scanning operation is a third lens face of the scanning lens 6 on which the incident angle is changed by ±38 degrees.

Embodiment 1

As shown in FIG. 1a, an antireflection coating film 11 is formed on the above third lens face to provide the first structure of the present invention. The antireflection coating film 11 is formed as follows in this Embodiment 1. Namely, a thin film made of $Al_2O_3$ and having refractive index $n_1 = 1.63$ is directly formed on the third lens face of the scanning lens such that this thin film has a thickness of 141 nm ($=\lambda/4n_1$). In this case, $\lambda$ designates a used wavelength 780 nm of the light beam. A thin film made of $MgF_2$ and having refractive index $n_2 = 1.38$ is formed on this thin film of $Al_2O_3$ such that this thin film of $MgF_2$ has a thickness of 120 nm ($=\lambda/4n_2$). The antireflection coating film is formed by these two thin films. Each of the above film thicknesses is an optimum value with respect to the thickness of the antireflection coating film. The optical scanning mode is set to the A-mode.

Transmittance on the third face of the scanning lens 6 is provided by this antireflection coating film 11 as follows with respect to each of image heights.

| image height: | −150 | −100 | −50 | 0 | +50 | +100 | +150 |
|---|---|---|---|---|---|---|---|
| transmittance third face of lens for scanning | 0.991 | 0.998 | 1.000 | 1.000 | 1.000 | 0.998 | 0.991 |

Figure 6A:
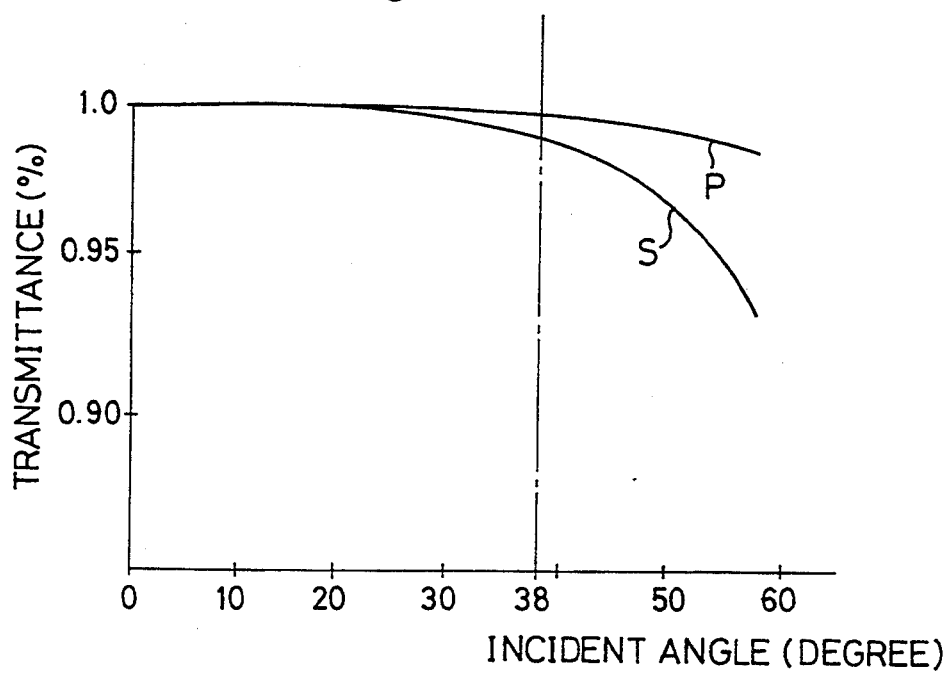
FIGS. 6a and 6b are graphs for explaining effects of the present invention obtained in Embodiment 1.

FIG. 6a shows the relation between the incident angle and reflectivity. A change in reflectivity is small with respect to each of the S-polarized light and the P-polarized light in a region in which the incident angle is changed by ±38 degrees.

When the optical scanning operation is performed in the A-mode by disposing the antireflection coating film 11, a shading amount is provided as follows with respect to each of the image heights.

| | shading amount | | | | | | |
|---|---|---|---|---|---|---|---|
| image height: | −150 | −100 | −50 | 0 | +50 | +100 | +150 |

-continued

| | shading amount | | | | | |
|---|---|---|---|---|---|---|
| A mode | −3.1 | −0.7 | 0 | −0.6 | −1.7 | −4.4 | −8.2 |

Figure 6B:
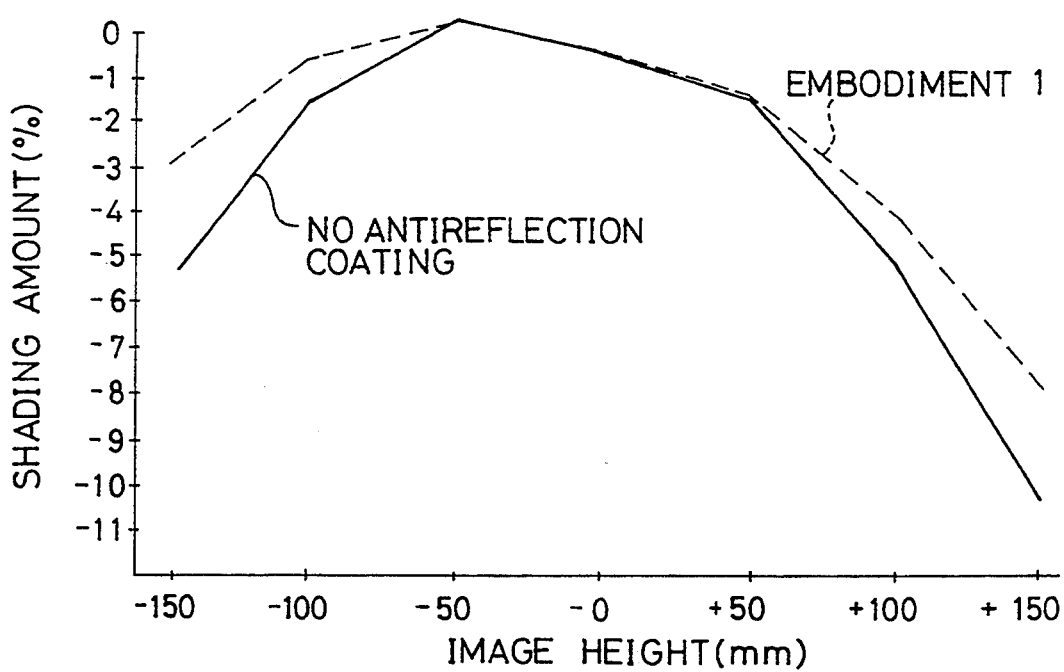

A shading state is shown by a broken line in FIG. 6b. A solid line in FIG. 6b shows a shading state in which no antireflection coating film 11 is disposed. As can be seen from the comparison of these shading states, it should be understood that shading is clearly improved.

Embodiment 2

The Embodiment 2 relates to the third structure of the present invention. In the above Embodiment 1, the thickness of the antireflection coating film formed on the third face of the scanning lens 6 is set to be an optimum value. In contrast to this, in this Embodiment 2, the thickness of the above antireflection coating film is set to be greater than the above optimum value. Namely, similar to the Embodiment 1, when the antireflection coating film is formed by two layer films having refractive indices $n_1$ and $n_2$, thicknesses $d_1$ and $d_2$ of these two films are provided as $d_1=\lambda/4n_1$ and $d_2=\lambda/4n_2$ as mentioned above. In accordance with the third structure of the present invention, these thicknesses $d_1$ and $d_2$ are set to satisfy $d_1>\lambda/4n_1$ and $d_2>\lambda/4n_2$.

The thin film made of $Al_2O_3$ in the Embodiment 1 is formed such that the thickness of this thin film is equal to 172 nm. A thin film made of $MgF_2$ is formed on this thin film of $Al_2O_3$ such that the thickness of the thin film of $MgF_2$ is equal to 146 nm. At this time, transmittance on the third face of the scanning lens 6 is provided as follows with respect to each of the image heights.

| image height: | −150 | −100 | −50 | 0 | +50 | +100 | +150 |
|---|---|---|---|---|---|---|---|
| transmittance third face of lens for scanning | 0.991 | 0.987 | 0.985 | 0.984 | 0.985 | 0.987 | 0.991 |

Figure 7A:
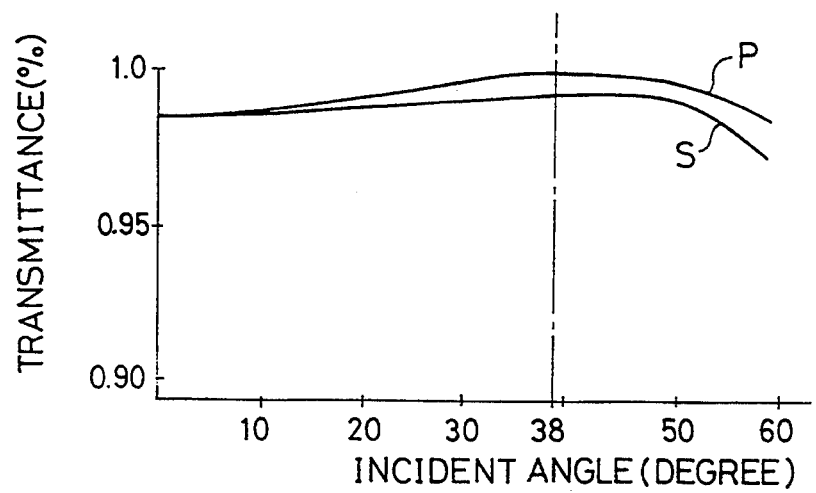
FIGS. 7a and 7b are graphs for explaining effects of the present invention obtained in Embodiment 2.

FIG. 7a shows the relation between the incident angle and reflectivity. A change in reflectivity is small with respect to each of the S-polarized light and the P-polarized light in a region in which the incident angle is changed by ±38 degrees. Transmittance is increased with respect to each of the S-polarized light and the P-polarized light in this region as the incident angle is increased.

When the antireflection coating film 11 having the above thickness is disposed and the optical scanning operation is performed in the A-mode, the shading amount is provided as follows with respect to each of the image heights.

| | shading amount | | | | | | |
|---|---|---|---|---|---|---|---|
| image height: | −150 | −100 | −50 | 0 | +50 | +100 | +150 |
| A mode | −1.6 | −0.3 | 0 | −0.7 | −1.8 | −4.0 | −6.8 |

Figure 7B:
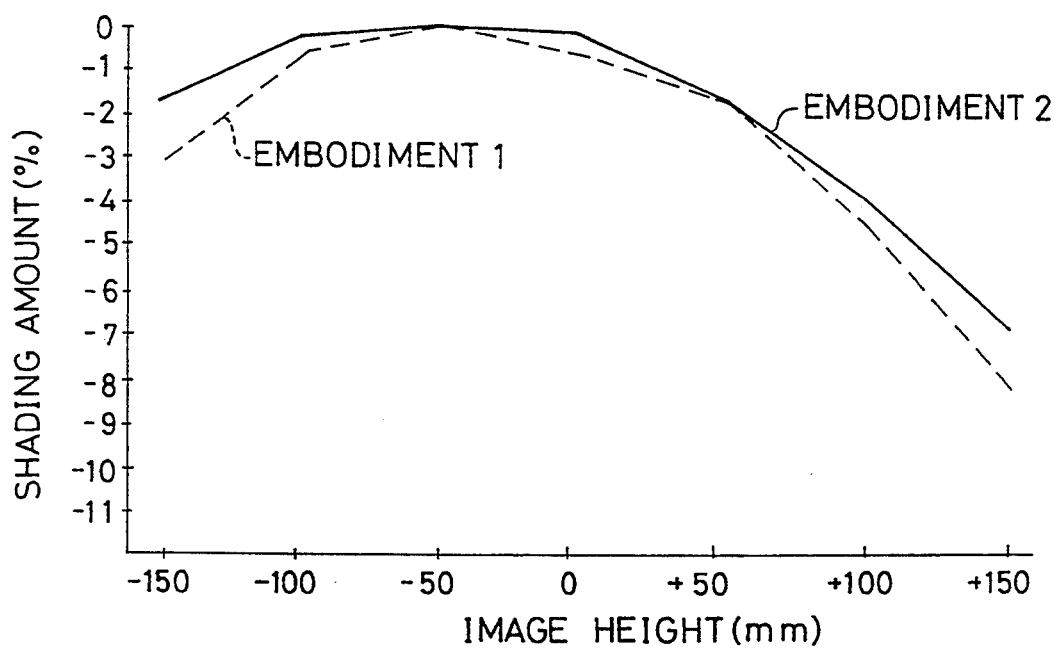

A shading state is shown by a solid line in FIG. 7b. The shading state in the Embodiment 1 is also shown by a broken line in FIG. 7b. As can be seen from the comparison of these shading states, it should be understood that shading is clearly improved.

In accordance with the fourth structure of the present invention as a modification of the Embodiment 2, the thickness of each of layers of the above antireflection coating film is set to a thickness for providing optimum antireflection effects at the incident angle of zero degree on the optical axis. The thickness of each of the layers is set to a thickness for providing the optimum antireflection effects at the incident angle of 38 degrees in both end portions in the main scan-corresponding direction. The thickness of each of the layers is gradually increased from a central portion thereof toward the both end portions. Further, the cover glass 8 can be coated with an antireflection coating film. In this case, the thickness of this antireflection coating film is set such that transmittance in each of both end portions of the antireflection coating film is higher than transmittance in a central portion of the antireflection coating film in the main scan-corresponding direction.

Embodiment 3

The Embodiment 3 relates to the fifth and seventh structures of the present invention. In the Embodiment 3, the thickness of the increased reflecting coating film 12 formed on a face of the mirror 7 for bending an optical path in the optical scanner shown in FIG. 1a is set to be larger than an optimum thickness.

Four layers composed of a thin film made of $MgF_2$ and having refractive index $n_3=1.38$ and a thin film made of $TiO_2$ and having refractive index $n_4=2.35$ are alternately formed on an aluminum face of the mirror 7. The thin film of $MgF_2$, the thin film of $TiO_2$, the thin film of $MgF_2$ and the thin film of $TiO_2$ are sequentially stacked from an aluminum mirror side toward an air region. At this time, optimum thicknesses $d_3$ and $d_4$ of the thin films of $MgF_2$ and $TiO_2$ are respectively set to $d_3=\lambda/4n_3=83$ nm and $d_4=\lambda/4n_4=141$ nm in the case of the used wavelength $\lambda=780$ nm. In the seventh structure of the present invention, these thicknesses $d_3$ and $d_4$ are set to satisfy $d_3>\lambda/4n_3$ and $d_4>\lambda/4n_4$. In the Embodiment 3, these thicknesses $d_3$ and $d_4$ are respectively set to 101 nm and 172 nm.

At this time, reflectivity of the mirror 7 is provided as follows with respect to each of the image heights.

| image height: | −150 | −100 | −50 | 0 | +50 | +100 | +150 |
|---|---|---|---|---|---|---|---|
| reflectivity | 0.960 | 0.952 | 0.944 | 0.940 | 0.944 | 0.952 | 0.960 |

Figure 8A:
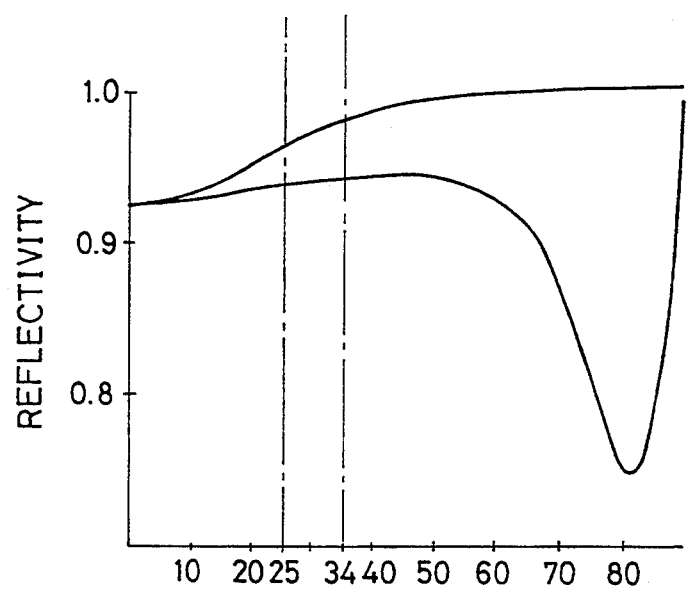
FIGS. 8a and 8b are graphs for explaining effects of the present invention obtained in Embodiment 3.

FIG. 8a shows the relation between the incident angle and reflectivity. Reflectivity is increased with respect to each of the S-polarized light and the P-polarized light as the incident angle is increased in a region in which the incident angle is changed from 25 degrees to 34 degrees.

When the increased reflecting coating film 12 having the above thickness is disposed and the optical scanning operation is performed in the A-mode, the shading amount is provided as follows with respect to each of the image heights.

| | shading amount | | | | | | |
|---|---|---|---|---|---|---|---|
| image height: | −150 | −100 | −50 | 0 | +50 | +100 | +150 |
| A mode | −4.1 | −1.0 | 0 | −0.5 | −1.8 | −4.6 | −9.2 |

Figure 8B:
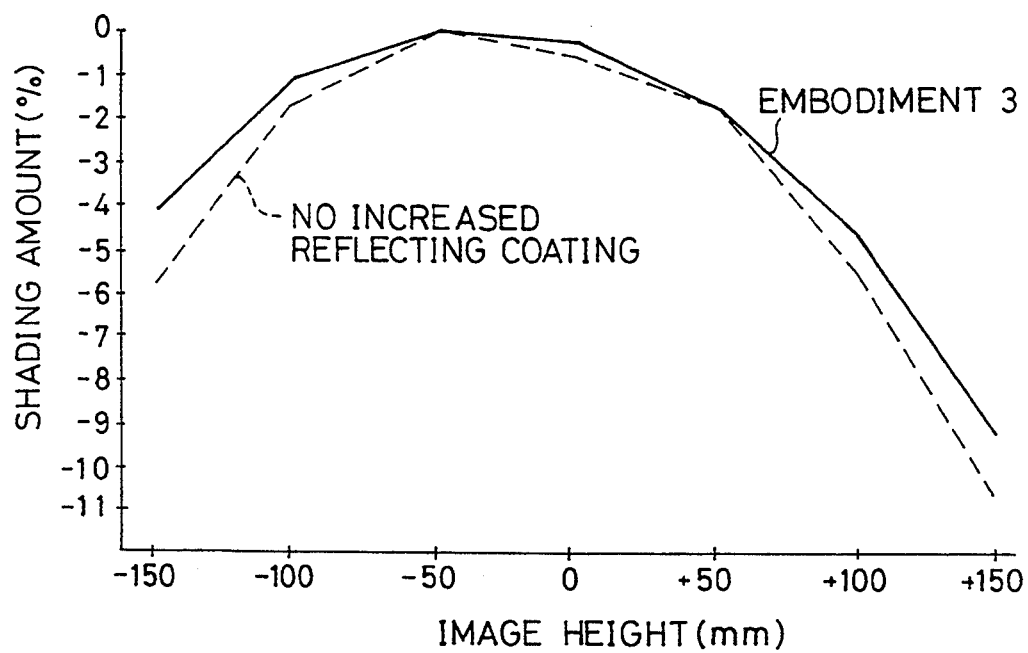

A shading state is shown by a solid line in FIG. 8b. A broken curve in FIG. 8b shows a shading state in which no increased reflecting coating film 12 is used. As can be seen from the comparison of these shading states, it should be understood that shading is improved.

In accordance with the sixth structure of the present invention as a modification of the Embodiment 3, the thickness of each of layers of the above increased reflecting coating film is set to a thickness for providing optimum increased reflecting effects at the incident angle of 25 degrees on the optical axis. The thickness of each o the layers is set to a thickness for providing the optimum increased reflecting effects at the incident angle of 34 degrees in both end portions in the main scan-corresponding direction. The thickness of each of the layers is gradually increased from a central portion thereof toward the both end portions.

The next Embodiments 4 and 5 relate to the eighth to tenth structures of the present invention. As shown in FIG. 1a, a wavelength plate 13 is arranged between the light source 1 and the deflecting reflecting face 5.

In the Embodiment 4, a ¼ wavelength plate is used as the wavelength plate 13 and a laser beam from the light source is incident to the deflecting reflecting face as substantially circularly polarized light. In this case, the laser beam incident to each of optical elements after the deflecting reflecting face 5 includes a P-polarized component and an S-polarized component at an equal ratio. Accordingly, shading states are equal to each other in the optical scanning A and B modes.

Embodiment 4

When the ¼ wavelength plate is disposed in a position of the wavelength plate 13 as shown in FIG. 1a, reflectivity and transmittance on each of interfaces after the deflecting reflecting face are commonly provided as follows in the A and B modes with respect to each of the image heights.

| image height: | −150 | −100 | −50 | 0 | +50 | +100 | +150 |
|---|---|---|---|---|---|---|---|
| deflecting reflecting face | 0.858 | 0.865 | 0.896 | 0.870 | 0.869 | 0.869 | 0.868 |
| lens for scanning | | | | | | | |
| first face | 0.949 | 0.950 | 0.951 | 0.951 | 0.951 | 0.950 | 0.949 |
| second face | 0.950 | 0.951 | 0.951 | 0.951 | 0.951 | 0.951 | 0.950 |
| third face | 0.946 | 0.950 | 0.950 | 0.951 | 0.950 | 0.950 | 0.946 |
| fourth face | 0.951 | 0.951 | 0.951 | 0.951 | 0.951 | 0.951 | 0.951 |
| mirror for bending optical path | 0.980 | 0.981 | 0.982 | 0.982 | 0.982 | 0.981 | 0.980 |
| cover glass | | | | | | | |
| first face | 0.957 | 0.957 | 0.957 | 0.957 | 0.957 | 0.957 | 0.957 |
| second face | 0.957 | 0.957 | 0.957 | 0.957 | 0.957 | 0.957 | 0.957 |

Light reaching efficiency on the scanned face is provided as follows in the A and B modes with respect to each of the image heights.

| image height: | −150 | −100 | −50 | 0 | +50 | +100 | +150 |
|---|---|---|---|---|---|---|---|
| light reaching efficiency | 0.625 | 0.634 | 0.639 | 0.640 | 0.639 | 0.637 | 0.632 |

The shading amount is provided as follows in the A and B modes.

| image height: | −150 | −100 | −50 | 0 | +50 | +100 | +150 |
|---|---|---|---|---|---|---|---|
| shading amount | −2.3 | −0.9 | −0.2 | 0 | −0.2 | −0.5 | −1.3 |

Figure 9:
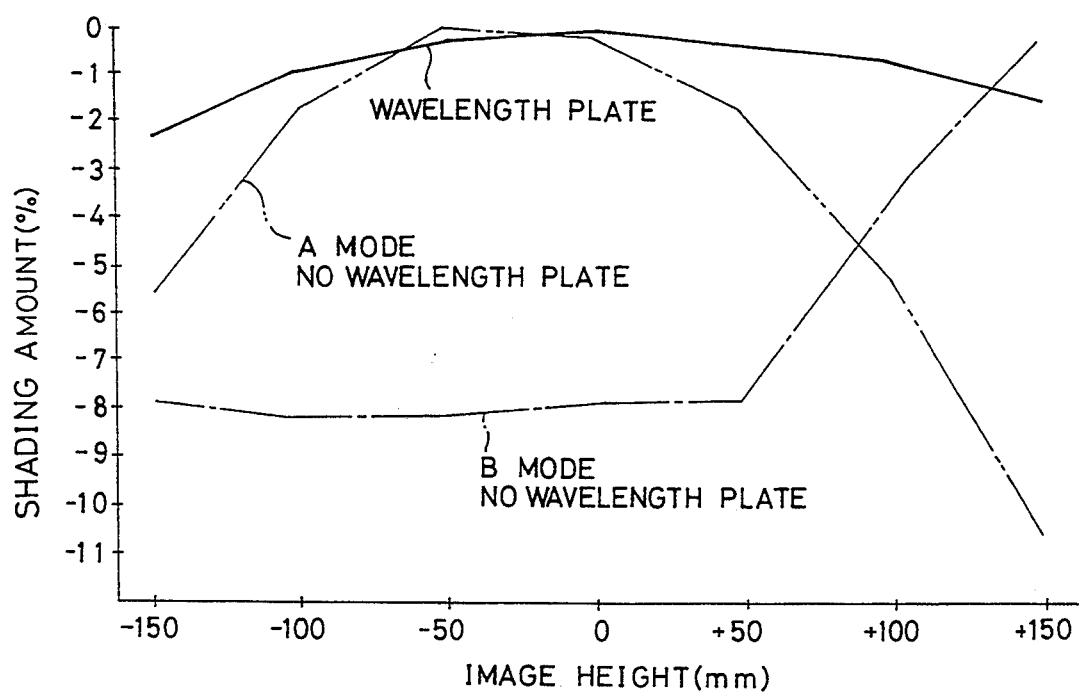
FIG. 9 is a graph for explaining effects of the present invention obtained in Embodiments 4 and 5.

FIG. 9 shows a shading state. It should be understood that shading is very preferably improved by using the wavelength plate irrespective of the A and B modes.

Embodiment 5

As shown in FIG. 1a, a ½ wavelength plate is disposed in a position of the wavelength plate 13. A laser beam from the light source 1 is incident to the deflecting reflecting face 5 in a state in which a polarizing direction of the laser beam is rotated 45 degrees from an original polarizing direction. Accordingly, P and S polarizations are equivalent to each other in a polarizing state of the laser beam with respect to each of optical elements after the deflecting reflecting face 5. Reflectivity and transmittance on each of interfaces are commonly provided as follows in the A and B modes with respect to each of the image heights.

| image height: | −150 | −100 | −50 | 0 | +50 | +100 | +150 |
|---|---|---|---|---|---|---|---|
| deflecting reflecting face | 0.858 | 0.865 | 0.896 | 0.870 | 0.869 | 0.869 | 0.868 |
| lens for scanning | | | | | | | |
| first face | 0.949 | 0.950 | 0.951 | 0.951 | 0.951 | 0.950 | 0.949 |
| second face | 0.950 | 0.951 | 0.951 | 0.951 | 0.951 | 0.951 | 0.950 |
| third face | 0.946 | 0.950 | 0.950 | 0.951 | 0.950 | 0.950 | 0.946 |
| fourth face | 0.951 | 0.951 | 0.951 | 0.951 | 0.951 | 0.951 | 0.951 |
| mirror for bending optical path | 0.980 | 0.981 | 0.982 | 0.982 | 0.982 | 0.981 | 0.980 |
| cover glass | | | | | | | |
| first face | 0.957 | 0.957 | 0.957 | 0.957 | 0.957 | 0.957 | 0.957 |
| second face | 0.957 | 0.957 | 0.957 | 0.957 | 0.957 | 0.957 | 0.957 |

Light reaching efficiency on the scanned face is provided as follows in the A and B modes with respect to each of the image heights.

| image height: | −150 | −100 | −50 | 0 | +50 | +100 | +150 |
|---|---|---|---|---|---|---|---|
| light reaching efficiency | 0.625 | 0.634 | 0.639 | 0.640 | 0.639 | 0.637 | 0.632 |

The shading amount is provided as follows in the A and B modes.

| image height: | −150 | −100 | −50 | 0 | +50 | +100 | +150 |
|---|---|---|---|---|---|---|---|
| shading amount | −2.3 | −0.9 | −0.2 | 0 | −0.2 | −0.5 | −1.3 |

Namely, reflectivity, transmittance, the light reaching efficiency and the shading amount are completely equal to those in the case of the above-mentioned Embodiment 4. Accordingly, the shading amount is provided as shown in FIG. 9.

In the B-mode in each of the above-mentioned Embodiments 1 to 5, the optical scanning operation is performed in a state in which the linear polarizing direction of the laser beam emitted from the light source is parallel to the cross scan-corresponding direction and corresponds to this cross scan-corresponding direction. As mentioned above, the optical scanning operation is generally performed in the B-mode and the semiconductor laser array is generally used as a light source. When the optical scanning operation is performed in the B-mode by using the semiconductor laser array, the polarizing direction of the laser beam emitted from the light source is generally inclined a small angle about 5 degrees with respect to the main scan-corresponding direction as mentioned above. Accordingly, shading in this case is slightly different from that in the B-mode in the above Embodiments.

Embodiment 6

Figure 10A:
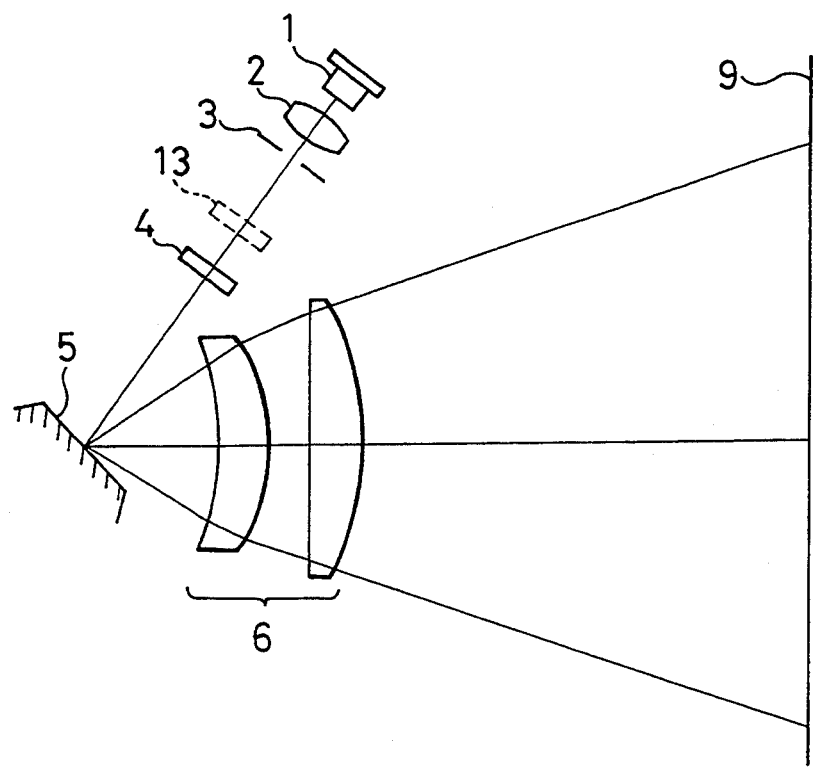
FIGS. 10a and 10b are respectively a view showing the construction of an optical scanner in accordance with Embodiment 6 of the present invention and a graph for explaining effects of the present invention obtained in this Embodiment 6.

An optical scanner in this Embodiment 6 is constructed as shown in FIG. 10a by removing the mirror 7 from the optical arrangement of the optical scanner shown in FIG. 1a. For brevity, constructional members corresponding to those in FIG. 1a are designated by the same reference numerals. A cover glass 8 is used although this cover glass is not shown in FIG. 10a.

When no wavelength plate 13 is used, light reaching efficiency and a shading amount are provided as follows when an image height is set to −147 mm, 0 and +147 mm.

| image height: | −147 | 0 | +147 |
|---|---|---|---|
| light reaching efficiency | 88.4 | 94.3 | 100 |
| shading amount | −11.6 | −5.8 | 0 |

In contrast to this, In the Embodiment 6, a ½ wavelength plate is used as the wavelength plate 13 and the direction of a main cross section of this ½ wavelength plate is set to be inclined 20 degrees with respect to the polarizing direction of the laser beam from the light source. An arraying direction of the semiconductor laser array constituting the light source is inclined 5 degrees with respect to the main scan-corresponding direction. The polarizing direction of the laser beam incident to the deflecting reflecting face 5 is set to be inclined 45 degrees with respect to the main scan-corresponding direction. As a result, the light reaching efficiency and the shading amount are provided as follows with respect to each of the above image heights.

| image height: | −147 | 0 | +147 |
|---|---|---|---|
| light reaching efficiency | 93.8 | 100 | 96 |
| shading amount | −6.2 | 0 | −4.2 |

Figure 10B:
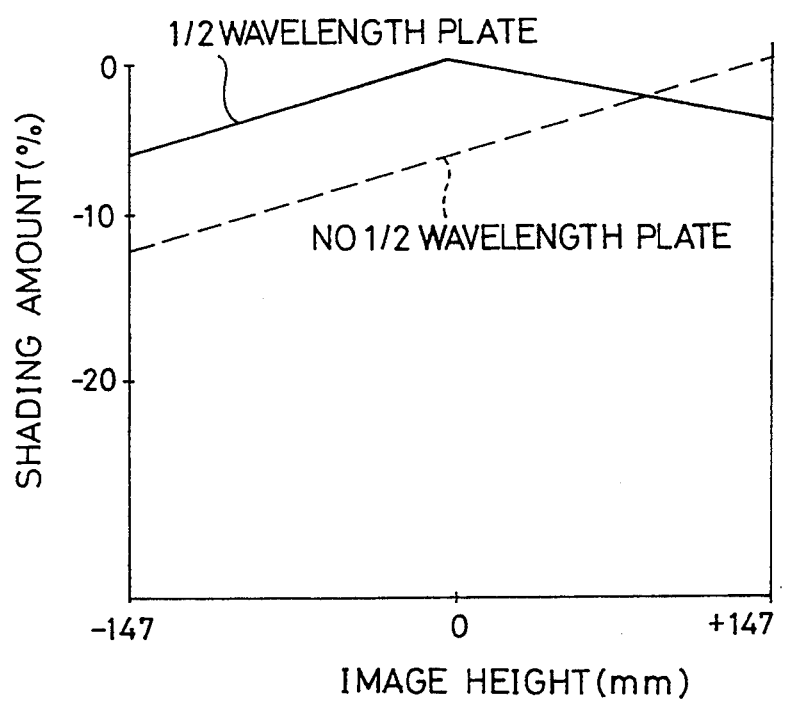

FIG. 10b shows a shading state. It should be understood that shading is effectively reduced by using the ½ wavelength plate.

Embodiment 7

Figure 11:
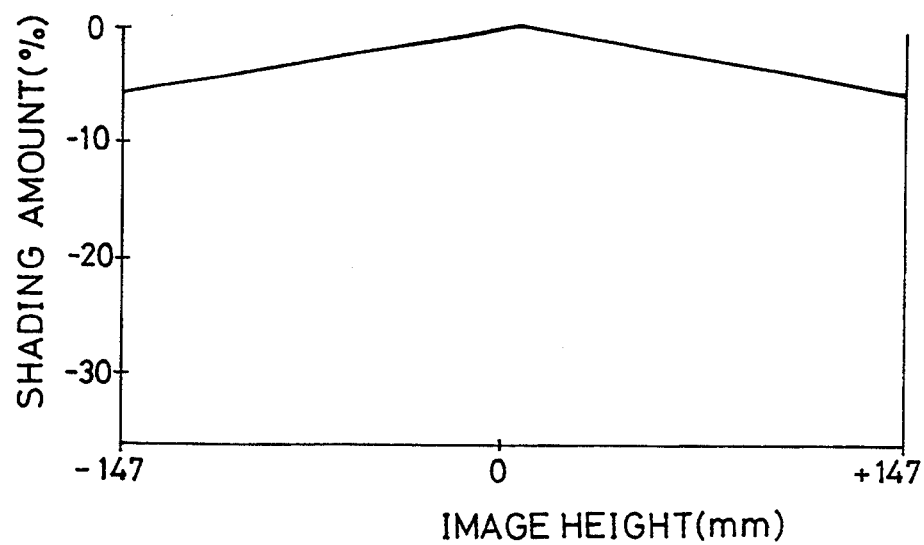
FIG. 11 is a graph for explaining effects of the present invention obtained in Embodiment 7.

In the optical arrangement of the optical scanner shown in FIG. 1a, a semiconductor laser array is used as the light source and an arraying direction of this semiconductor laser array is inclined 5 degrees with respect to the main scan-corresponding direction. Further, a ½ wavelength plate is used as the wavelength plate 13 and the inclination of a main cross section of this ½ wavelength plate is adjusted such that shading is most preferably reduced. Thus, a shading amount is provided as shown in FIG. 11. In this case, the mirror 7 is inclined 45 degrees with respect to the cross scan-corresponding direction.

Figure 12:
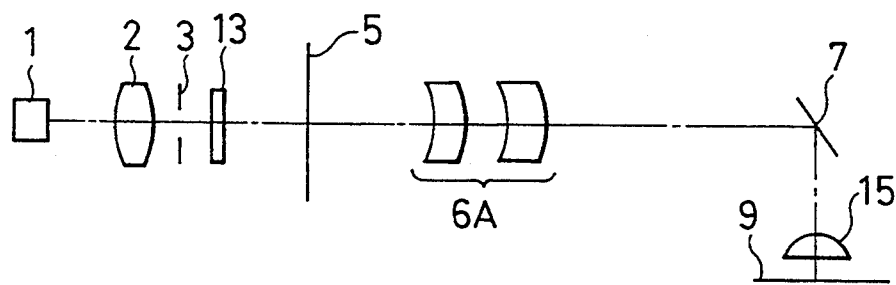
FIG. 12 is a view showing a modified optical arrangement of the optical scanner to which the present invention can be applied.

An optical scanner shown in FIG. 12 is shown as a modified example. In this modified example, the cylindrical lens 4 is removed from the optical scanner shown in FIG. 1a. An elongated cylindrical lens 15 for correcting the inclination of a reflecting face is arranged in the vicinity of a scanned face 9. The scanning lens 6 shown in FIG. 1a is constructed by an anamorphic lens for setting the conjugate relation in geometrical optics between positions of the deflecting reflecting face and the scanned face in the cross scan-corresponding direction. However, no lens 6A for scanning is an anamorphic lens in an optical system shown in FIG. 12 since a polarized laser beam is a parallel beam. In the optical scanner shown in FIG. 12, shading can be effectively reduced by adjusting the direction of a main cross section of the ½ wavelength plate 13.

In FIG. 1a, the wavelength plate 13 constructed by a ½ or ¼ wavelength plate may be arranged in any position between the light source 1 and the deflecting reflecting face 5 as mentioned above. In the case of the structure shown in FIG. 1a, the wavelength plate 13 may be arranged in a position between the light source 1 and the condenser lens 2, a position between the condenser lens 2 and the aperture 3, or a position between the aperture 3 and the cylindrical lens 4. Otherwise, the wavelength plate 13 may be arranged in a position between the cylindrical lens 4 and the deflecting reflecting face 5. Further, the wavelength plate 13 may be integrated with a cover glass on an emitting side of the laser beam in the package of a semiconductor laser or a semiconductor laser array constituting the light source 1. The wavelength plate 13 can be integrated with a body tube of the condenser lens 2. Further, the wavelength plate 13 can be arranged such that this wavelength plate 13 comes in contact with the cylindrical lens 4.

In the following description, the wavelength plate 13 is constructed by a ½ wavelength plate as one example. Some concrete examples of the arrangement of the wavelength plate will next be described. When the ½ wavelength plate is used, it is necessary to rotatably dispose the ½ wavelength plate since the direction of a main cross section of this ½ wavelength plate is adjusted.

Figure 13:
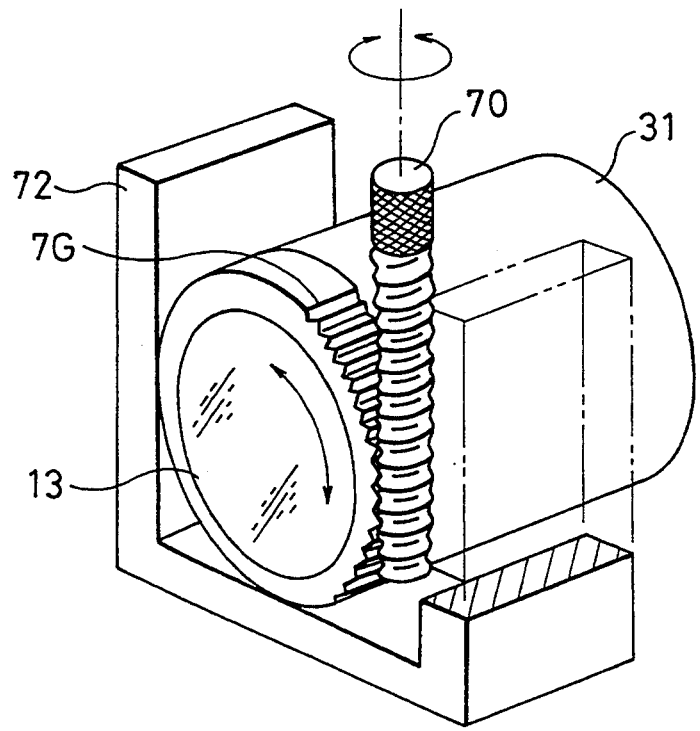
FIG. 13 is a view showing an example in which a ½ wavelength plate is integrated with the body tube of a condenser lens.

FIG. 13 shows an example in which the ½ wavelength plate 13 is integrated with a body tube 31 of the condenser lens 2.

A teeth portion 7G is formed in a portion of an outer circumference of the ½ wavelength plate 13. The entire teeth portion is rotatably surrounded by a fixed member 72. A screw 70 is engaged with the teeth portion 7G and is rotatably supported by an unillustrated support means without any shift in position. The ½ wavelength plate 13 can be rotated by rotating the screw 70. In this example, the ½ wavelength plate 13 and the body tube 31 are integrated with each other. Accordingly, when the ½ wavelength plate 13 is rotated as mentioned above, the body tube 31 is integrally rotated around the optical axis together with the rotation of the ½ wavelength plate 13.

Figure 14:
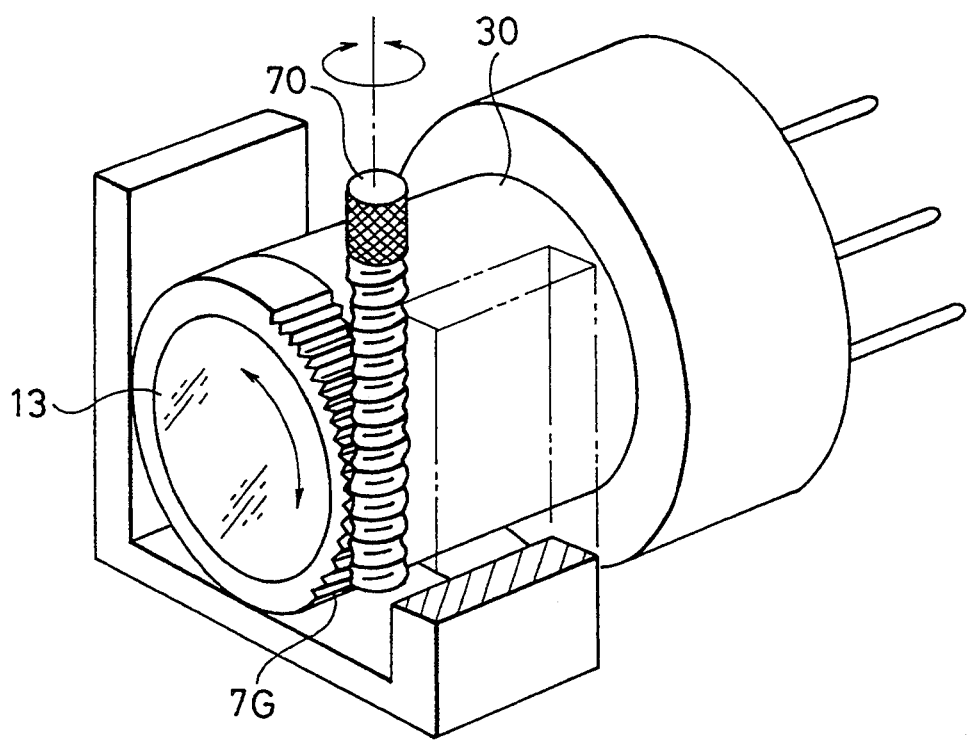
FIG. 14 is a view showing an example in which the ½ wavelength plate is integrated with the package of a semiconductor laser array.

FIG. 14 shows an example in which a ½ wavelength plate 13 is integrated with a cover glass of a package 30 of the semiconductor laser array as a light source. In this example, the package 30 is fixed to a fixed member so that no package 30 is moved. An emitting portion of the laser beam is formed in a cylindrical shape and a cover glass is disposed in an end portion of this emitting portion. However, in this example, the ½ wavelength plate 13 is rotatably fitted onto this end portion instead of the cover glass. Similar to the example shown in FIG. 13, the direction of a main cross section can be adjusted by rotating a screw 70.

Figure 15A:
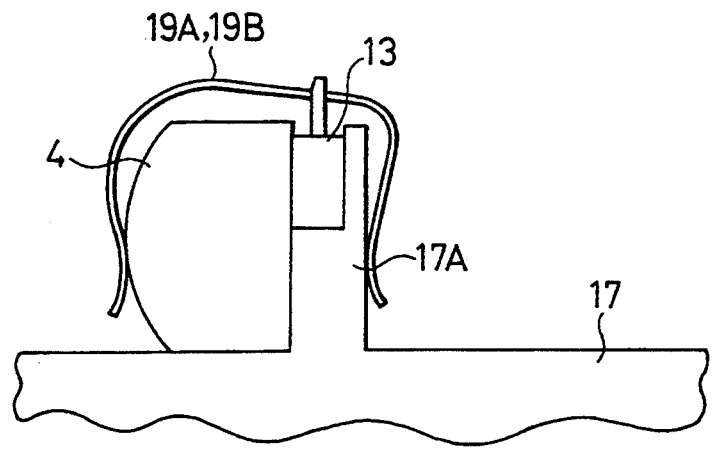
FIGS. 15a to 15c are views for explaining an example in which the ½ wavelength plate is arranged such that this ½ wavelength plate comes in contact with a cylindrical lens.
Figure 15B:
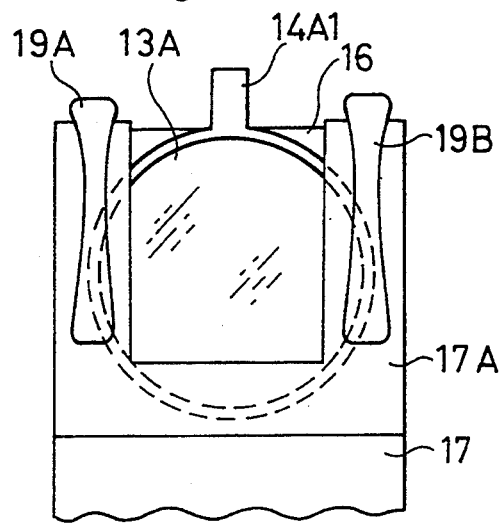
Figure 15C:
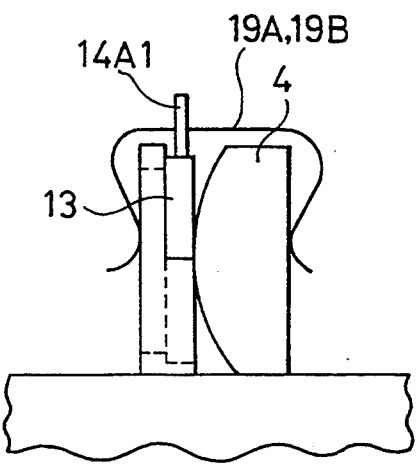

Each of FIGS. 15a to 15c shows a structure for arranging the ½ wavelength plate 13 in close contact with the cylindrical lens 4. FIG. 15a is a side view of this structure and FIG. 15b is a view of this structure seen from an optical axis direction. A holding portion 17A is formed in a lens holder 17. One side of the holding portion 17A comes in contact with a flat lens face of the cylindrical lens 4 and forms a holding space in the shape of a pocket together with this flat lens face. The ½ wavelength plate 13 is inserted into this holding space. The cylindrical lens 4 and the holding portion 17A are fixed to each other by a pair of leaf springs 19A and 19B. The ½ wavelength plate 13 is swingingly moved to adjust its position by a thumbscrew 14A1 formed in the ½ wavelength plate 13, thereby adjusting the direction of the main cross section.

In this example, the ½ wavelength plate 13 is arranged on a flat face side of the cylindrical lens. However, as shown in FIG. 15c, the ½ wavelength plate 13 may be arranged in close contact with a cylindrical face of the cylindrical lens 4. When the ½ wavelength plate is arranged in close contact with the cylindrical lens face, a space for arranging constructional members in the optical scanner can be effectively utilized in comparison with a case in which the ½ wavelength plate is arranged in a separate position.

As mentioned above, in the above novel optical scanner of the present invention, it is possible to effectively reduce shading based on the relation between an optical scanning system and the polarizing direction of a laser beam emitted from a semiconductor laser or a semiconductor laser array as a light source, thereby performing a preferable optical scanning operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner for reducing shading in which a semiconductor laser or a semiconductor laser array is set to a light source and a laser beam from the light source is deflected by light deflecting means having a deflecting reflecting face and is converged by a lens for scanning as a light spot on a scanned face to perform an optical scanning operation, said optical scanner comprising:
one or more mirrors for bending an optical path of the laser beam and arranged between the light deflecting means and the scanned face; and
an increased reflecting coating film disposed on a mirror face of the one or more mirrors such that reflectivity is gradually increased from a central portion of the increased reflecting coating film in a main scan-corresponding direction toward both end portions of this film.

2. An optical scanner for reducing shading as claimed in claim 1, wherein the increased reflecting coating film is set to be gradually thicker toward the both end portions in the main scan-corresponding direction.

3. An optical scanner for reducing shading as claimed in claim 1, wherein the increased reflecting coating film is set to be thicker than an optimum thickness with respect to a wavelength of the laser beam.

* * * * *